United States Patent
Tai et al.

(10) Patent No.: US 12,351,720 B2
(45) Date of Patent: Jul. 8, 2025

(54) INK COMPOSITION, LIGHT CONVERSION LAYER AND LIGHT EMITTING DEVICE

(71) Applicant: eChem Solutions Corp., Taoyuan (TW)

(72) Inventors: Chun-Kuan Tai, Taoyuan (TW); Hsiao-Jen Lai, Taoyuan (TW); Yu-Chun Chen, Taoyuan (TW)

(73) Assignee: eChem Solutions Corp., Taoyuan (TW)

( * ) Notice: Subject to any disclaimer, the term of this patent is extended or adjusted under 35 U.S.C. 154(b) by 68 days.

(21) Appl. No.: 17/939,895

(22) Filed: Sep. 7, 2022

(65) Prior Publication Data

US 2023/0125656 A1    Apr. 27, 2023

(30) Foreign Application Priority Data

Sep. 10, 2021    (TW) ................................. 110133670

(51) Int. Cl.
*C09D 11/30*    (2014.01)
*C09D 11/033*    (2014.01)
(Continued)

(52) U.S. Cl.
CPC ............ *C09D 11/30* (2013.01); *C09D 11/033* (2013.01); *C09D 11/037* (2013.01);
(Continued)

(58) Field of Classification Search
CPC ....... G02F 1/1361; B82Y 20/00; B82Y 40/00; C09D 11/033; C09D 11/037; C09D 11/30; C09D 11/102; C09K 11/883
(Continued)

(56) References Cited

U.S. PATENT DOCUMENTS 10,233,387 B2 *  3/2019  Qiu ......................... C08K 3/32
10,941,338 B2 *  3/2021  Pillay Narrainen ... C09K 11/08
(Continued)

FOREIGN PATENT DOCUMENTS

CN    107532079    1/2018
CN    111094417    5/2020
(Continued)

OTHER PUBLICATIONS 1-page article for DisperBYK by BYK—Paint & Coatings by Ultrus Prospector, Downloaded on Jun. 18, 2024.*
(Continued)

*Primary Examiner* — Tae H Yoon
(74) *Attorney, Agent, or Firm* — JCIPRNET

(57) ABSTRACT

An ink composition, a light conversion layer and a light emitting device are provided. The resin composition includes a quantum dot (A), a first resin (B1), a second resin (B2), an ethylenically unsaturated monomer (C), an initiator (D) and a solvent (E). The first resin (B1) is an alkali-insoluble resin, and the second resin (B2) is an alkali-soluble resin. The first resin (B1) includes a compound represented by the following Formula (1):

Formula (1)

(Continued)

In Formula (1), n is an integer from 1 to 10, X is benzene, toluene or naphthalene, and Y is toluene, methylnaphthalene, tetrahydrodicyclopentadiene, or 4,4'-dimethyl-1,1'-biphenyl.

16 Claims, 2 Drawing Sheets

(51) Int. Cl.
    *C09D 11/037*      (2014.01)
    *C09D 11/102*      (2014.01)
    *C09K 11/88*      (2006.01)
    *G02F 1/1335*      (2006.01)
    *G02F 1/13357*      (2006.01)
    *B82Y 20/00*      (2011.01)
    *B82Y 40/00*      (2011.01)

(52) U.S. Cl.
CPC .......... *C09D 11/102* (2013.01); *C09K 11/883* (2013.01); *G02F 1/133614* (2021.01); *G02F 1/133617* (2013.01); *B82Y 20/00* (2013.01); *B82Y 40/00* (2013.01); *G02F 1/133514* (2013.01); *G02F 2202/36* (2013.01)

(58) Field of Classification Search
USPC .................................................. 523/160, 161
See application file for complete search history.

(56) References Cited

U.S. PATENT DOCUMENTS

| | | | | |
|---|---|---|---|---|
| 11,542,397 B2 * | 1/2023 | Seshimo | ................ | G02B 1/002 |
| 11,919,997 B2 * | 3/2024 | Liu | ...................... | C08G 63/688 |

FOREIGN PATENT DOCUMENTS

| | | | |
|---|---|---|---|
| JP | 2011053248 | | 3/2011 |
| JP | 2018128590 | | 8/2018 |
| JP | 2019131758 | | 8/2019 |
| JP | 2020015838 | * | 1/2020 |
| JP | 2020019902 | | 2/2020 |
| KR | 101998732 | | 7/2019 |
| TW | I565651 | | 1/2017 |
| TW | I619767 | | 4/2018 |
| TW | I628207 | | 7/2018 |
| TW | 108873472 A | * | 11/2018 |
| TW | I643934 | | 12/2018 |
| TW | I644926 | | 12/2018 |
| TW | I654278 | | 3/2019 |
| TW | 202000853 | | 1/2020 |
| TW | 202113028 | | 4/2021 |

OTHER PUBLICATIONS

"Office Action of Taiwan Counterpart Application", issued on Mar. 29, 2022, p. 1-p. 11.
"Office Action of China Counterpart Application", issued on Jun. 30, 2023, p. 1-p. 10.

* cited by examiner

INK COMPOSITION, LIGHT CONVERSION LAYER AND LIGHT EMITTING DEVICE

CROSS-REFERENCE TO RELATED APPLICATION

This application claims the priority benefit of Taiwanese application serial no. 110133670, filed on Sep. 10, 2021. The entirety of the above-mentioned patent application is hereby incorporated by reference herein and made a part of this specification.

BACKGROUND

Technical Field

The disclosure relates to an ink composition, and particularly relates to an ink composition suitable for a light conversion layer, a light conversion layer, and a light emitting device.

Description of Related Art

With the development of display device technology, in order to improve the display quality of display devices, a light conversion layer containing quantum dots is disposed in the display device in recent trends of development to improve the brightness and color purity of the display screen. However, the display device with quantum dot excites the green and red quantum dot light conversion layers by the light emitted from a blue EL (Electro-Luminescence) element. When the quantum dots are exposed to an oxygen and moisture-containing environment and are irradiated with blue light for a long time, the luminous efficiency of the quantum dots may decrease rapidly, thereby affecting the performance of the display device.

SUMMARY

The disclosure provides an ink composition, a light conversion layer, and a light emitting device. The quantum dot light conversion layer formed by the ink composition has good water vapor and oxygen resistance properties to improve luminous efficiency.

The ink composition of the disclosure includes a quantum dot (A), a first resin (B1), a second resin (B2), an ethylenically unsaturated monomer (C), an initiator (D), and a solvent (E). The first resin (B1) is an alkali-insoluble resin, and the second resin (B2) is an alkali-soluble resin. The first resin (B1) includes a compound represented by the following formula (1).

Formula (1)

In formula (1), n is an integer from 1 to 10, X is benzene, toluene or naphthalene, and Y is toluene, methylnaphthalene, tetrahydrodicyclopentadiene, 4,4'-dimethyl-1,1'-biphenyl or 3-methyloxy-1-methylnaphthalene.

In an embodiment of the disclosure, the quantum dot (A) includes at least one selected from the group consisting of green quantum dots and red quantum dots. The emission wavelength of the green quantum dots is in the range of greater than or equal to 500 nm and less than 600 nm. The emission wavelength of the red quantum dots is in the range of greater than or equal to 600 nm and less than or equal to 800 nm.

In an embodiment of the disclosure, the first resin (B1) includes at least one selected from the group consisting of the following compounds:

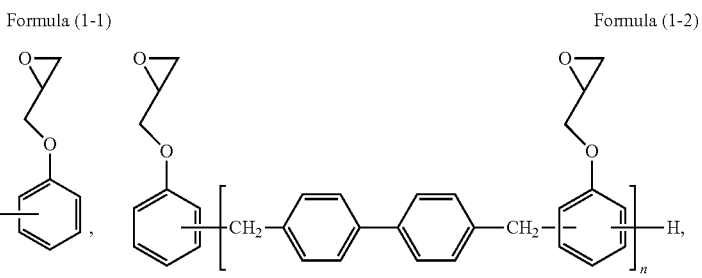

Formula (1-1), Formula (1-2)

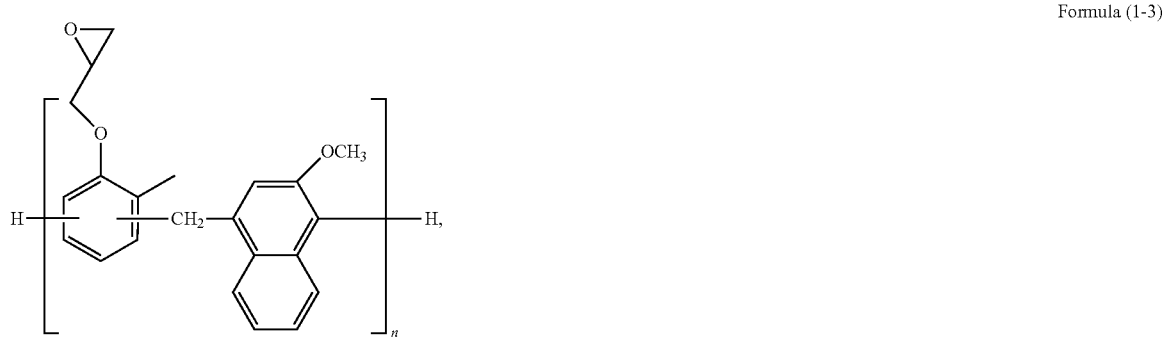

Formula (1-3)

Formula (1-4)

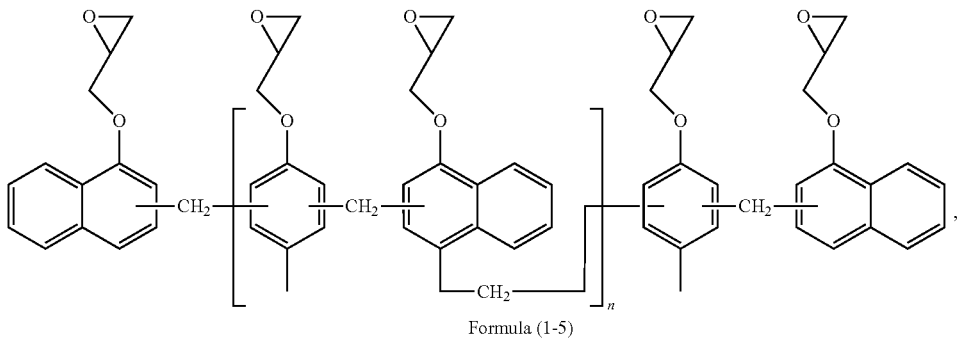

Formula (1-5)

Formula (1-6)

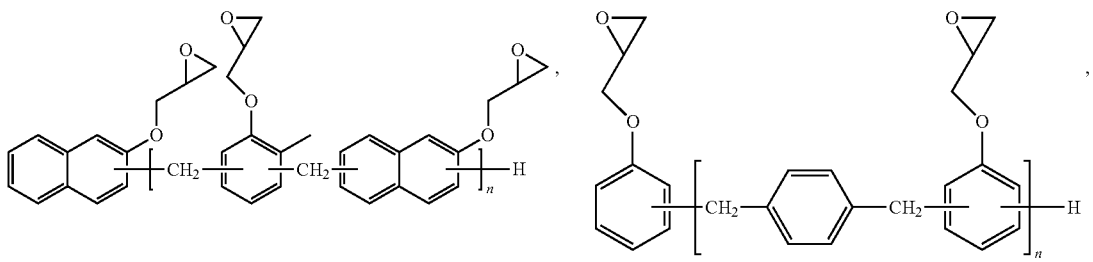

In formula (1-1) to formula (1-6), n is an integer of 1-10.

In an embodiment of the disclosure, the second resin (B2) is a (meth)acrylic resin.

In an embodiment of the disclosure, the second resin (B2) is composed of one or more monomers selected from (meth)acrylic acid, alkyl (meth)acrylate, hydroxyl-containing (meth)acrylate, ether-containing (meth)acrylate, alicyclic (meth)acrylate, styrene compound, maleimide compound, and bisphenol fluorene compound.

In an embodiment of the disclosure, the ethylenically unsaturated monomer (C) includes at least one selected from the group consisting of the following compounds:

Formula (C-1)

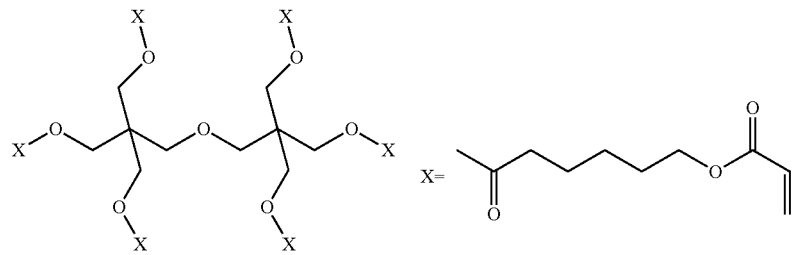

Formula (C-2)

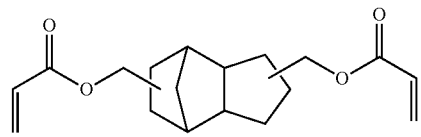

Formula (C-3)

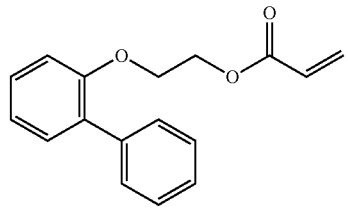 [SMILES: C=CC(=O)OCCOc1ccccc1-c1ccccc1]

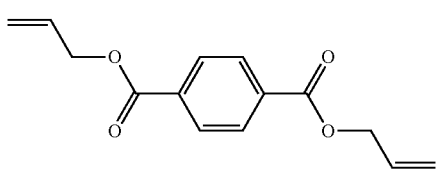 [SMILES: C=CCOC(=O)c1ccc(C(=O)OCC=C)cc1]

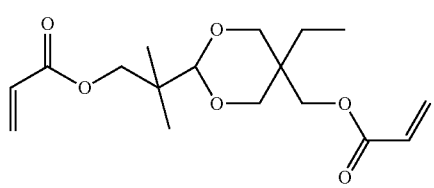 [SMILES: C=CC(=O)OCC1(CC)COC(C(C)(C)COC(=O)C=C)OC1]

In an embodiment of the disclosure, based on a total amount of 100 parts by weight of ink composition, the amount of quantum dot (A) is 0.5 to 15 parts by weight, the total amount of the first resin (B1) and the second resin (B2) is 0.5 to 20 parts by weight, the amount of the ethylenically unsaturated monomer (C) is 0.5 to 20 parts by weight, and the amount of the initiator (D) is 0.01 to 5 parts by weight.

In an embodiment of the disclosure, based on a total amount of 100 parts by weight of the ink composition, the amount of the solvent (E) is 65 to 85 parts by weight.

In an embodiment of the disclosure, the ink composition further includes an additive (F). The additive (F) includes a phenyl-based compound, a phosphorus-based compound or a sulfur-based compound. The phenyl-based compound includes at least one of the compound represented by the following formula (F-1) and the compound represented by the following formula (F-2):

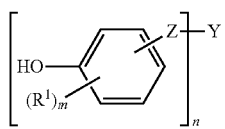

Formula (F-1)

In formula (F-1), $R^1$ is an alkyl group, and m is an integer from 0 to 3,

Z is an alkylene group,

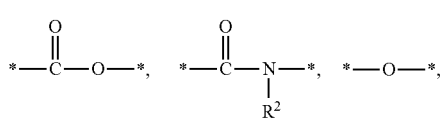

or a combination thereof, $R^2$ is hydrogen or an alkyl group, when n is 1, Y is hydrogen or an alkyl group, when n is 2, Y is a single bond, an alkylene group, S, Formula (C-4)

Formula (C-5)

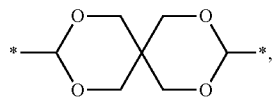

or a combination thereof, when n is 3, Y is a single bond, a trivalent alkyl group, a trivalent phenyl group,

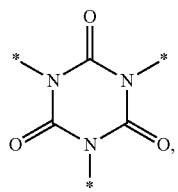 [SMILES: *n1c(=O)n(*)c(=O)n(*)c1=O]

or a combination thereof, when n is 4, Y is carbon,

* represents the bonding position;

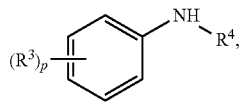

Formula (F-2)

In formula (F-2), $R^3$ is an alkyl group, $R^4$ is hydrogen or a phenyl group, and p is 0 or 1.

In an embodiment of the disclosure, the phenyl-based compound is at least one selected from the group consisting of the following compounds:

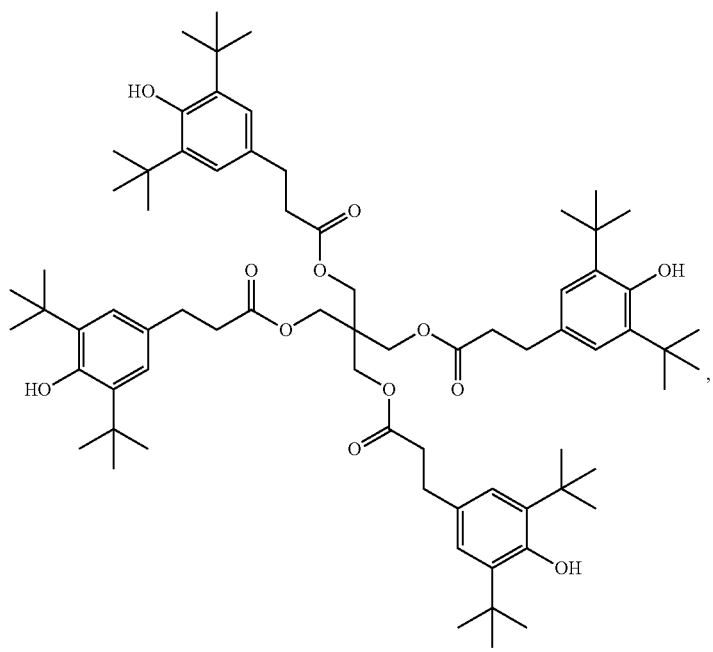
Formula (f-1)
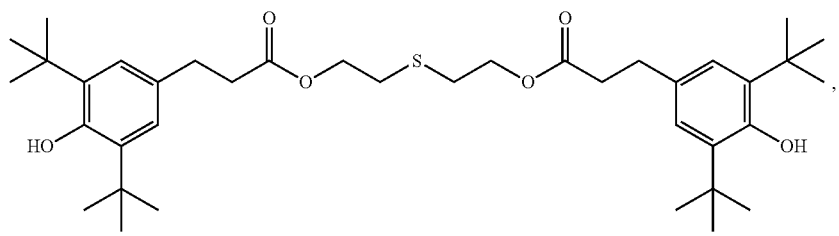
Formula (f-2)
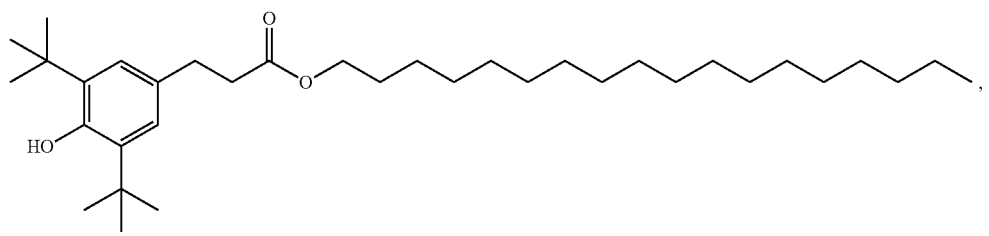
Formula (f-3)
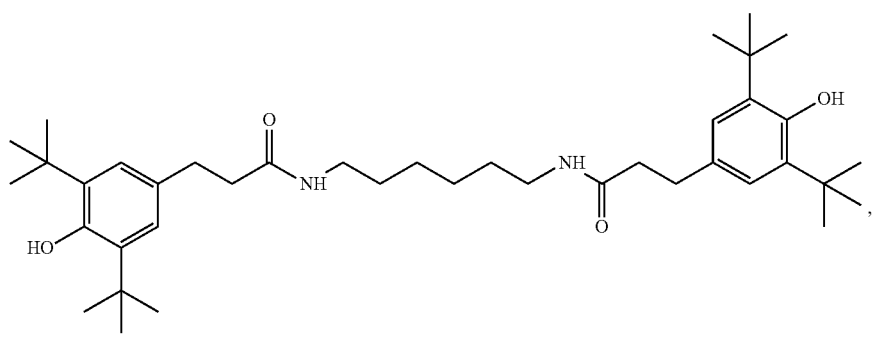
Formula (f-4)

Formula (f-5)
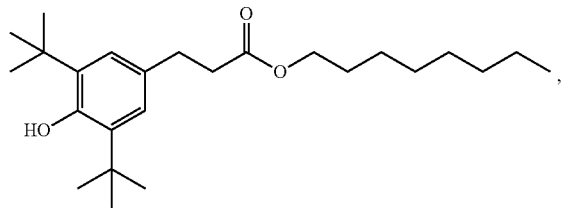
Formula (f-6)
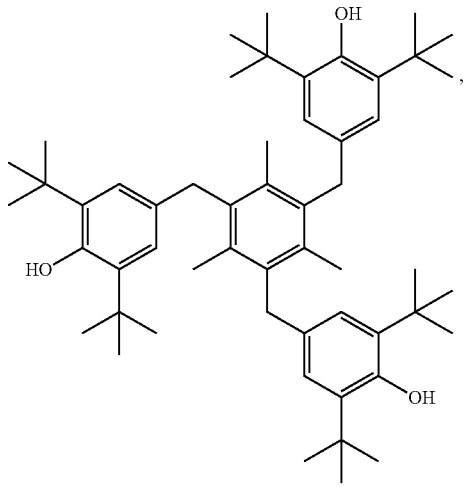
Formula (f-7)
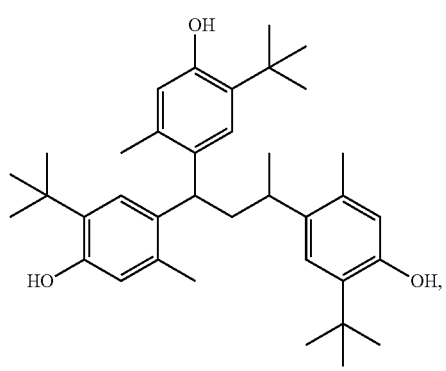
Formula (f-8)
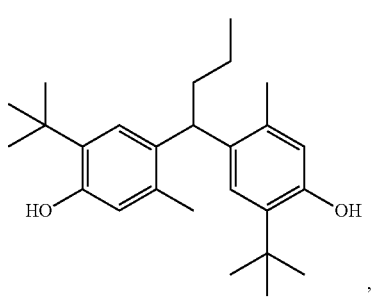
Formula (f-9)
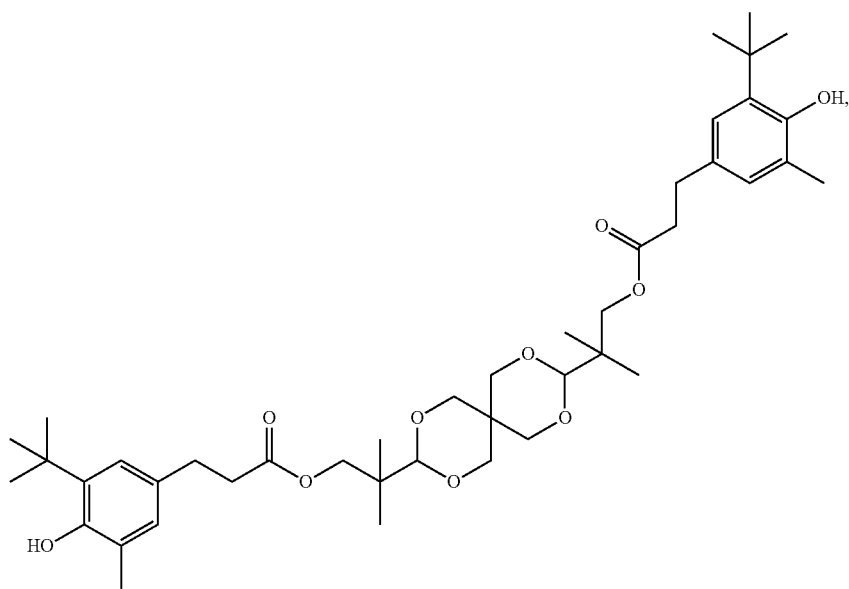

-continued
Formula (f-10)
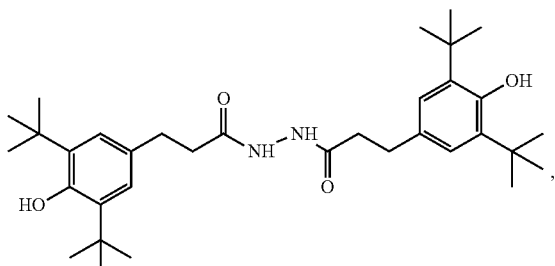
Formula (f-11)
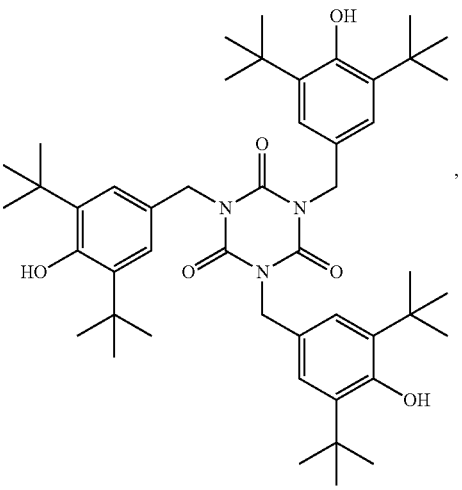
Formula (f-12)
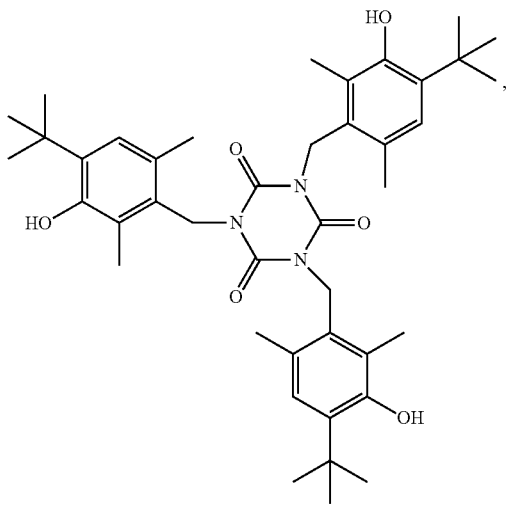
Formula (f-13)
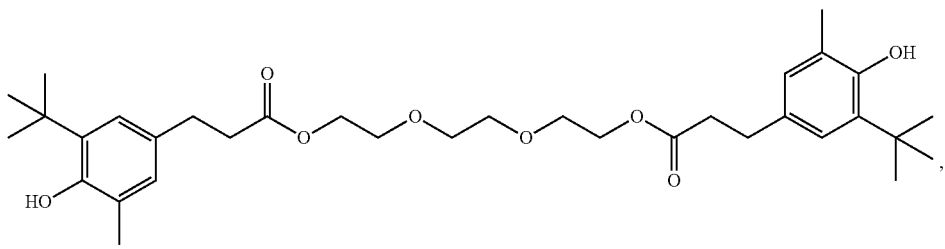
Formula (f-14)
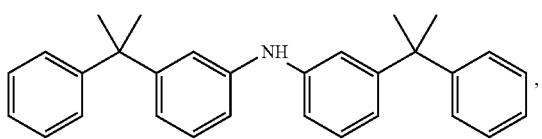
Formula (f-15)
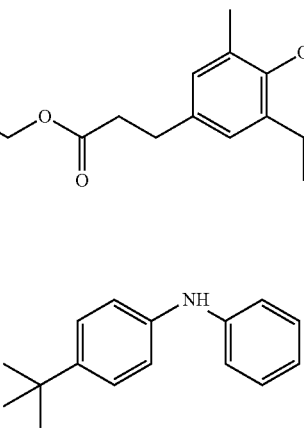
Formula (f-16)
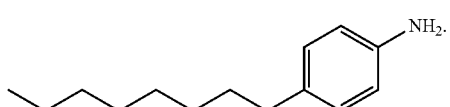

In an embodiment of the disclosure, the ink composition further includes a scatterer (G), and the scatterer (G) includes at least one selected from the group consisting of titanium dioxide, silicon dioxide, barium titanate, zirconium oxide, zinc oxide, and aluminum oxide.

In an embodiment of the disclosure, the boiling point of the solvent (E) is 180° C. to 250° C., and the surface tension is 28 mN/m or more.

The light conversion layer of the disclosure is formed of the ink composition.

In an embodiment of the disclosure, the light conversion layer further includes a red pattern layer, a green pattern layer, and a scatterer pattern layer. The red patterned layer includes red quantum dots, the green patterned layer includes green quantum dots, and the scatterer patterned layer does not contain quantum dots.

In an embodiment of the disclosure, the emission wavelength of the green quantum dots is in the range of greater than or equal to 500 nm and less than 600 nm, and the emission wavelength of the red quantum dots is in the range of greater than or equal to 600 nm and less than or equal to 800 nm.

The light emitting device of the disclosure includes the light conversion layer.

In an embodiment of the disclosure, the light emitting device further includes a substrate and a backlight module. The light conversion layer is located on the substrate, and the backlight module is arranged on one side of the substrate where the light conversion layer is provided.

In an embodiment of the disclosure, the light emitting device further includes a filter layer, and the filter layer is located between the substrate and the light conversion layer. The filter layer includes a red filter pattern, a green filter pattern and a blue filter pattern. The red filter pattern, the green filter pattern and the blue filter pattern contain no quantum dots.

Based on the above, the ink composition of the disclosure includes a first resin (B1) and a second resin (B2), the first resin (B1) is an alkali-insoluble resin, and the second resin (B2) is an alkali-soluble resin. The alkali-insoluble resin can be cross-linked by heating and ring-opening to achieve the effect of blocking water vapor and oxygen. The function of alkali-soluble resin is to adjust the viscosity and improve the dispersibility of quantum dots in the composition. Through such design, the ink composition of the disclosure has good water vapor and oxygen resistance properties, can effectively improve luminous efficiency while maintaining better dispersibility.

In order to make the above-mentioned features and advantages of the present disclosure more comprehensible, the following specific embodiments are described in detail as follows.

DESCRIPTION OF THE EMBODIMENTS

Figure 1:
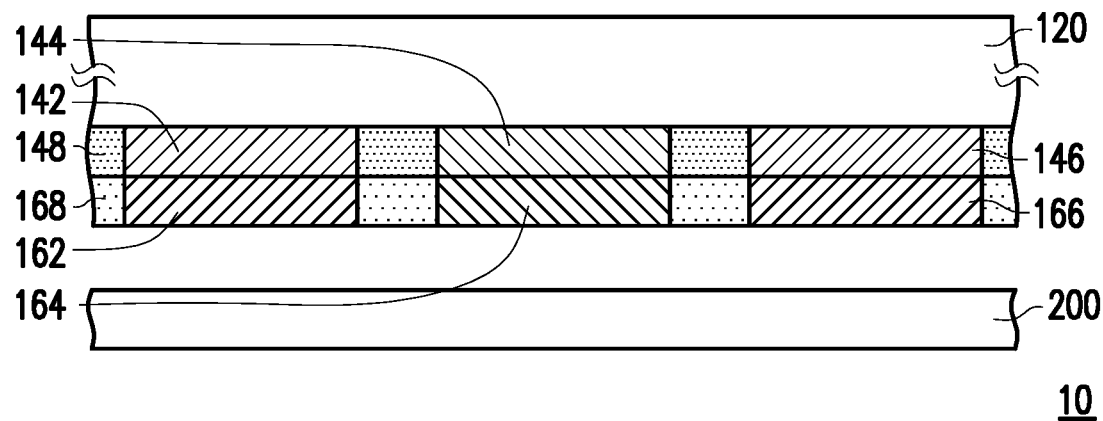
FIG. 1 is a schematic diagram of a light emitting device according to an embodiment of the disclosure.

Hereinafter, embodiments of the disclosure will be described in detail. However, these embodiments are illustrative, and the disclosure is not limited thereto.

In this disclosure, the range indicated by "a value to another value" is a summary expression that avoids listing all the values in the range one by one in the specification. Therefore, the indication of a specific numerical range covers any numerical value in the numerical range and the smaller numerical range defined by any numerical value in the numerical range, like the description of any numerical value and the smaller numerical range in the specification.

Hereinafter, the disclosure will be described more thoroughly with reference to the accompanying drawings, in which exemplary embodiments of the disclosure are shown. As those skilled in the art would realize, the described embodiments may be modified in various different ways without departing from the spirit or scope of the disclosure. In the drawings, the thickness of layers, films, panels, regions, etc., are exaggerated for clarity. Throughout the specification, the same reference numerals denote the same elements.

<Ink Composition>

The disclosure provides an ink composition including a quantum dot (A), a first resin (B1), a second resin (B2), an ethylenically unsaturated monomer (C), an initiator (D) and a solvent (E), and may further include an additive (F) and a scatterer (G). The first resin (B1) is an alkali-insoluble resin, and the second resin (B2) is an alkali-soluble resin. Hereinafter, the above-mentioned various components will be described in detail.

It is explained here that (meth)acrylic acid is adopted to refer to acrylic acid and/or methacrylic acid, and (meth)acrylate is adopted to refer to acrylate and/or methacrylate.

Quantum Dot (A)

In this embodiment, the quantum dot (A) may include at least one selected from the group consisting of green quantum dots and red quantum dots. The green quantum dots and the red quantum dots can absorb the light (such as blue light) emitted by the backlight module, and emit green light and red light respectively after energy conversion. The emission wavelength of the green quantum dots can be in the range of greater than or equal to about 500 nm and less than about 600 nm. The emission wavelength of the red quantum dots can be in the range of greater than or equal to about 600 nm and less than or equal to about 800 nm. In this embodiment, the emission wavelength of the quantum dots can be adjusted according to requirements. For example, the emission wavelength of the quantum dots can be adjusted according to the use of the light emitting device using the light conversion layer formed of the ink composition.

For example, the quantum dot (A) may include quantum dots composed of group II-VI elements, quantum dots composed of group III-V elements, or other suitable quantum dots. The quantum dots can be single-layered quantum dots or multi-layered quantum dots. The multi-layered quantum dots may have a core-shell structure.

There is no specific limitation to the quantum dots composed of group II-VI elements, and appropriate quantum dots composed of group II-VI elements can be selected according to requirements. For example, quantum dots composed of group II-VI elements may include CdS, CdSe, CdTe, ZnS, ZnSe, HgS or other suitable quantum dots. Quantum dots composed of group II-VI elements may be adopted in a single element or a combination of multiple elements.

There is no specific limitation to the quantum dots composed of group III-V elements, and appropriate quantum dots composed of group III-V elements can be selected according to requirements. For example, the quantum dots composed of group III-V elements may include InP, InAs, or other suitable quantum dots. The quantum dots composed of group III-V elements may be adopted in a single element or a combination of multiple elements.

Based on a total amount of 100 parts by weight of the ink composition, the amount of the quantum dot (A) is 0.5 to 15 parts by weight.

First Resin (B1)

The first resin (B1) is an alkali-insoluble resin, which includes a compound represented by the following formula (1). The first resin (B1) may be adopted in a single compound or a combination of multiple compounds.

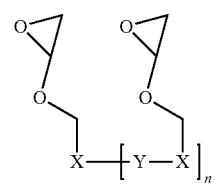

Formula (1)

In formula (1), n is an integer from 1 to 10, X is benzene, toluene or naphthalene, and Y is toluene, methylnaphthalene, tetrahydrodicyclopentadiene, 4,4'-dimethyl-1,1'-biphenyl or 3-methyloxy-1-methylnaphthalene.

Preferred specific examples of the compound represented by the formula (1) include compounds represented by the following formula (1-1) to formula (1-6). In formula (1-1) to formula (1-6), n is an integer of 1-10. The first resin (B1) is preferably at least one selected from the group consisting of compounds represented by the following formula (1-1) to formula (1-6).

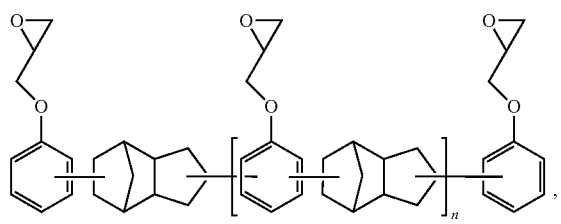

Formula (1-1)

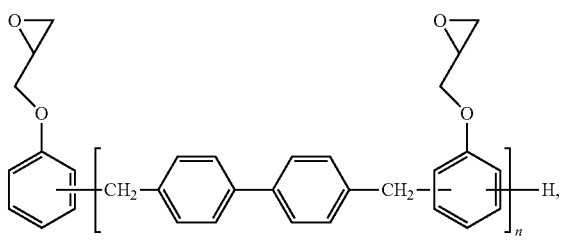

Formula (1-2)

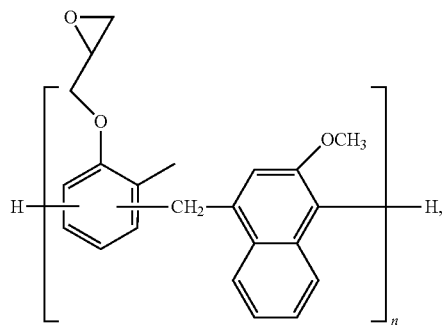

Formula (1-3)

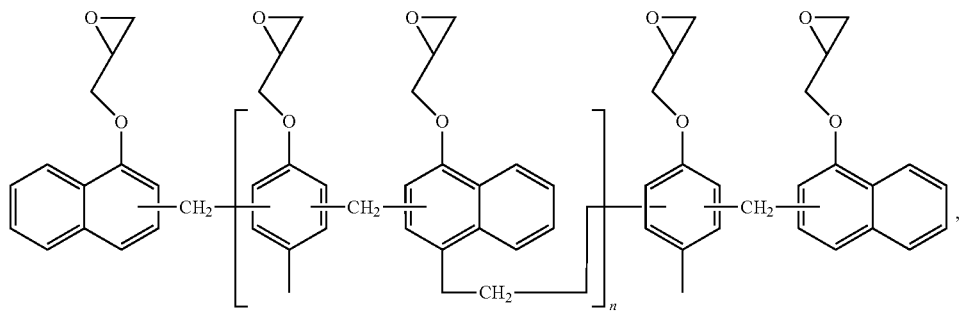

Formula (1-4)

Formula (1-5)

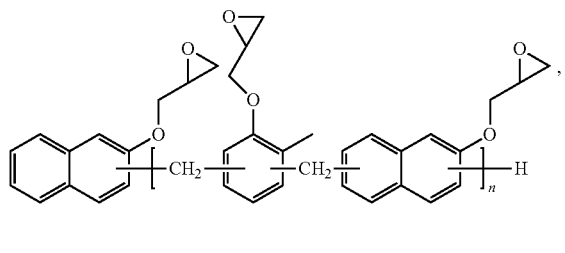

Formula (1-6)

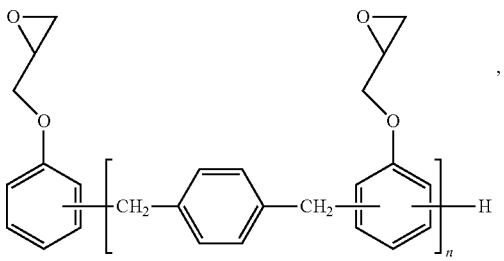

The first resin (B1) is an alkali-insoluble resin, which can be cross-linked by heating and ring-opening to achieve the effect of blocking water vapor and oxygen. The second resin (B2) described in detail below is an alkali-soluble resin, which is used to adjust the viscosity and improve the dispersibility of the quantum dots in the composition. In the ink composition of the disclosure, the first resin (B1) as the alkali-insoluble resin and the second resin (B2) as the alkali-soluble resin must be used together. In this way, water vapor and oxygen resistance can be effectively achieved while better dispersibility can be maintained.

Based on the total amount of 100 parts by weight of the ink composition, the total amount of the first resin (B1) and the second resin (B2) is 0.5 to 20 parts by weight. When the ink composition contains both the first resin (B1) as an alkali-insoluble resin and the second resin (B2) as an alkali-soluble resin, a better water vapor and oxygen resistance properties can be achieved, thereby effectively improving reduced luminous efficiency while better dispersibility can be maintained.

Second Resin (B2)

The second resin (B2) is an alkali-soluble resin. In this embodiment, the second resin (B2) may be a (meth)acrylic resin. For example, the second resin (B2) can be composed of (meth)acrylic acid, alkyl (meth)acrylate, hydroxyl-containing (meth)acrylate, ether group-containing (meth)acrylate, alicyclic (meth)acrylate or other suitable monomers. In addition, the second resin (B2) may be composed of a styrene compound, a maleimide compound, or a bisphenol fluorene compound. The second resin (B2) may be composed of a single type of monomer, or may be composed of multiple types of monomers.

The alkyl (meth)acrylate may include methyl (meth)acrylate, ethyl (meth)acrylate, propyl (meth)acrylate, butyl (meth)acrylate, (meth)tertiary butyl acrylate, benzyl (meth)acrylate, lauryl (meth)acrylate or other suitable alkyl (meth)acrylates.

The hydroxyl-containing (meth)acrylate may include hydroxyethyl (meth)acrylate, hydroxypropyl (meth)acrylate, or other suitable hydroxyl-containing (meth)acrylates.

The ether group-containing (meth)acrylate may include ethoxyethyl (meth)acrylate, glycidyl (meth)acrylate or other suitable ether group-containing (meth)acrylates.

The alicyclic (meth)acrylate may include cyclohexyl (meth)acrylate, isophorone (meth)acrylate, dicyclopentadienyl (meth)acrylate or other suitable alicyclic (meth)acrylate.

For example, the second resin (B2) may be an alkali-soluble resin or a combination of multiple alkali-soluble resins. For example, the second resin (B2) may be the following alkali-soluble resin (B-1).

The structural unit contained in the alkali-soluble resin (B-1) is a structural unit represented by formula (b-1), a structural unit represented by formula (b-2), and a structural unit represented by formula (b-3). In this embodiment, the weight average molecular weight of the alkali-soluble resin (B-1) may be from 13,500 to 16,500, but is not limited thereto.

Formula (b-1)

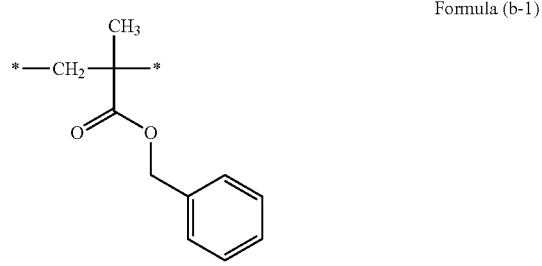

Formula (b-2)

Formula (b-3)

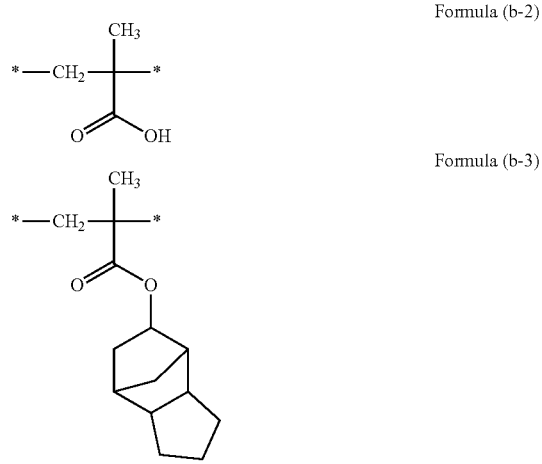

In the structural units represented by formula (b-1) to formula (b-3), *represents a bonding position.

As mentioned above, the first resin (B1) is an alkali-insoluble resin, which can be cross-linked through heating and ring-opening, thereby achieving the effect of blocking water vapor and oxygen. The second resin (B2) is an alkali-soluble resin, which is used to adjust the viscosity and improve the dispersibility of the quantum dots in the composition. In the ink composition of the disclosure, the first resin (B1) as the alkali-insoluble resin and the second resin (B2) as the alkali-soluble resin must be used together. In this way, water vapor and oxygen resistance can be effectively achieved while better dispersibility can be maintained.

Based on a total amount of 100 parts by weight of the ink composition, the total amount of the first resin (B1) and the second resin (B2) is 0.5 to 20 parts by weight. When the ink composition contains both the first resin (B1) as an alkali-insoluble resin and the second resin (B2) as an alkali-soluble resin, a good water vapor and oxygen resistance properties can be achieved, thereby effectively improving luminous efficiency while maintaining better dispersibility.

Ethylenically Unsaturated Monomer (C)

In this embodiment, the ethylenically unsaturated monomer (C) includes at least one ethylenically unsaturated functional group. The ethylenically unsaturated monomer (C) may include at least one selected from the group consisting of monofunctional monomers, bifunctional monomers, trifunctional monomers, and multifunctional monomers. The ethylenically unsaturated monomer (C) can be adopted in a single monomer or a combination of multiple monomers.

Monofunctional monomers may include ethylene glycol o-phenylphenyl ether acrylate, ethoxylated p-cumene acrylate or other suitable monomers having an ethylenically unsaturated functional group.

The bifunctional monomer may include decane dimethanol diacrylate, 2-propenoic acid-[2-[1,1-dimethyl-2-(2-acryloxy)ethyl]-5-ethyl-1,3-dioxan-5-yl]methyl ester, diallyl terephthalate, polyethylene glycol (400) diacrylate or other suitable monomers having two ethylenically unsaturated functional groups.

The trifunctional monomer may include triallyl isocyanurate or other suitable monomers having three ethylenically unsaturated functional groups.

Multifunctional monomers may include pentaerythritol triacrylate, ethoxylated pentaerythritol tetraacrylate, pentaerythritol hexaacrylate, homopolymers of 2-oxepanone and ester of 2-acrylate-2,2'-[oxo bis(methylene)]bis[2-(hydroxymethyl)-1,3-propanediol]-2-propenyl or other suitable monomers having four ethylenically unsaturated functional groups or more.

The ethylenically unsaturated monomer (C) is preferably at least one selected from the group consisting of compounds represented by the following formulas (C-1) to (C-5).

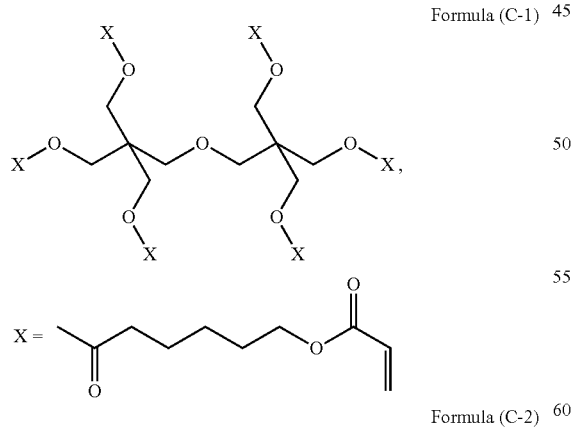

Formula (C-1)

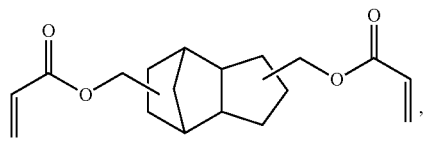

Formula (C-2)

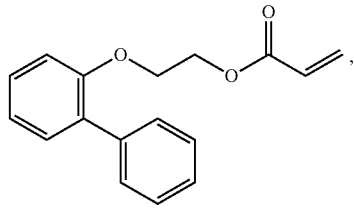

Formula (C-3)

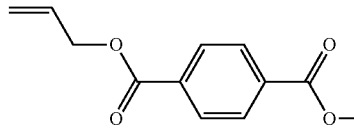

Formula (C-4)

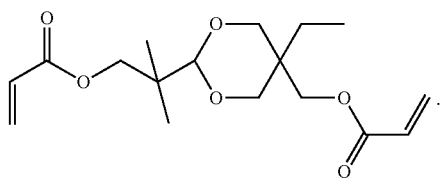

Formula (C-5)

Based on the total amount of 100 parts by weight of the ink composition, the amount of the ethylenically unsaturated monomer (C) is 0.5 to 20 parts by weight.

The function of ethylenically unsaturated monomer (C) in the ink composition is to participate in the polymerization reaction. When the ink composition includes the ethylenically unsaturated monomer (C), the ink composition can form a cured film after the curing process, and has the function of protecting quantum dots.

Initiator (D)

The initiator (D) includes a photopolymerization initiator and an acid generator. Photopolymerization initiators include at least one selected from the group consisting of triazine-based compounds, acetophenone-based compounds, diphenyl ketone-based compounds, diimidazole-based compounds, thioxanthone-based compounds, quinone-based compounds, acylphosphine oxide and acyl oxime compounds, preferably includes at least one selected from the group consisting of acyl oxime compounds and acetophenone-based compounds. However, the disclosure is not limited thereto, and other suitable photopolymerization initiators can also be adopted. The acid generator may include a sulfonium salt compound, an iodonium salt compound, an antimony-based compound, or a phosphorus-based compound, but is not limited thereto.

The triazine-based compound may include Chemcure-PAG-1 (product name; manufactured by Chembridge International Corp.), Chemcure-PAG-2 (product name; manufactured by Chembridge International Corp.) or other suitable triazine-based compounds. The triazine-based compound may be adopted in a single compound or a combination of multiple compounds.

The acetophenone-based compound may include Irgacure 907 and Irgacure 369E (product name; manufactured by BASF), Chemcure-96 (product name; manufactured by Chembridge International Corp.) or other suitable acetophenone-based compounds. The acetophenone-based compound may be adopted in a single compound or a combination of multiple compounds.

The diphenyl ketone-based compound may include Chemcure-BP and Chemcure-64 (product name; manufactured by Chembridge International Corp.) or other suitable diphenyl ketone-based compounds. The diphenyl ketone-based compound may be adopted in a single compound or a combination of multiple compounds.

The diimidazole-based compound may include Chemcure-BCIM and Chemcure-TCDM (product name; manufactured by Chembridge International Corp.) or other suitable diimidazole-based compounds. The diimidazole-based compound may be adopted in a single compound or a combination of multiple compounds.

The thioxanthone-based compound may include Irgacure ITX (product name; manufactured by BASF) or other suitable thioxanthone-based compounds. The thioxanthone-based compound may be adopted in a single compound or a combination of multiple compounds.

For the quinone-based compound, a suitable quinone-based compound can be selected. The quinone-based compound may be adopted in a single compound or a combination of multiple compounds.

The acylphosphine oxide may include Irgacure TPO and Irgacure 819 (product name; manufactured by BASF) or other suitable acylphosphine oxides. Acylphosphine oxides may be adopted in a single oxide or a combination of multiple oxides.

The acyl oxime compound may include Irgacure OXE-01, OXE-02, OXE-03 and OXE-04 (product name; manufactured by BASF) or other suitable acyl oxime compounds. The acyl oxime compound may be adopted in a single compound or a combination of multiple compounds.

The sulfonium salt compound may include TR-PAG series (manufactured by Changzhou Tronly New Electronic Materials Co., Ltd.) or other suitable sulfonium salt compounds. The sulfonium salt compound may be adopted in a single compound or a combination of multiple compounds.

The antimony-based compound may include CXC-1612 (product name; manufactured by King Industries) or other suitable antimony-based compounds. The antimony-based compound may be adopted in a single compound or a combination of multiple compounds.

The iodonium salt compound may include PAG-30401 (manufactured by Changzhou Tronly New Electronic Materials Co., Ltd.) or other suitable iodonium salt compounds. The iodonium salt compound may be adopted in a single compound or a combination of multiple compounds.

The sulfonium salt compound may include SI-B3 and SI-110 (manufactured by Sanshin Chemical Industry Co., Ltd.), or other suitable sulfonium salt compounds. The sulfonium salt compound may be adopted in a single compound or a combination of multiple compounds.

The phosphorus-based compound may include TAG-50401 (manufactured by Changzhou Tronly New Electronic Materials Co., Ltd.) or other suitable phosphorus-based compounds. The phosphorus compound may be adopted in a single compound or a combination of multiple compounds.

Based on the total amount of 100 parts by weight of the ink composition, the amount of the initiator (D) (that is, the total amount of the photopolymerization initiator and the acid generator) is 0.01 to 5 parts by weight.

When the ink composition includes an initiator (D) (i.e., photopolymerization initiator and acid generator), the photopolymerization initiator can generate free radicals during the exposure process to initiate polymerization, and the acid generator can generate acid to cause epoxy to open ring for cross-linking reaction.

Solvent (E)

The boiling point of solvent (E) is preferably 180° C. to 250° C. In terms of ink jet stability of the ink composition, the boiling point of the solvent (E) is preferably 180° C. or higher, and the surface tension is preferably 28 mN/m or higher. Since the solvent (E) must be removed during the manufacturing process of the light conversion layer, in consideration of the ease of removal of the solvent (E), the boiling point of the solvent (E) is preferably 250° C. or less.

For example, the solvent (E) may include propylene glycol monomethyl ether acetate, dipropylene glycol dimethyl ether, 1,2-propylene glycol diacetate, 3-cyclohexene-1-methanol, 1,4-butanediol diacetate, 1,3-butanediol diacetate, 1,6-diacetoxyhexane, 3-methoxybutyl acetate, ethylene glycol butyl ether acetate, diethylene glycol monoethyl ether acetate, diethylene glycol butyl ether acetate, glycerol triacetate, 1,3-butanediol, diethylene glycol ethyl ether, ethylene glycol diethyl ether, ethylene glycol dibutyl ether, ethylene glycol methyl ether acetate, ethylene glycol methyl ether acetate or ethylene glycol ethyl ether acetate. The solvent (E) may be adopted in a single solvent or a combination of multiple solvents.

Based on the total amount of 100 parts by weight of the ink composition, the amount of the solvent (E) is 65 to 85 parts by weight.

When the ink composition includes the solvent (E), the ink composition can be made to have an appropriate viscosity, so that the formed light conversion layer has good coating uniformity.

Additive (F)

An additive (F) may be added to the ink composition, and the additive (F) may include a phenyl-based compound, a phosphorus-based compound, or a sulfur-based compound.

The function of the phenyl-based compounds is to capture free radicals (ROO); the function of phosphorus-based compounds or sulfur-based compounds is to react with hydrogen peroxide (ROOH) to produce non-reactive products with no free radicals. The above-mentioned various types of additives may be used alone or together.

The phenyl-based compound includes at least one of a compound represented by the following formula (F-1) and a compound represented by the following formula (F-2). The phenyl-based compound may be adopted in a single compound or a combination of multiple compounds.

Formula (F-1)

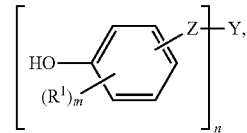

In formula (F-1), $R^1$ is an alkyl group, and m is an integer from 0 to 3,

Z is an alkylene group,

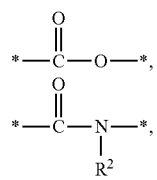

*—O—*, or a combination thereof, R² is hydrogen or an alkyl group,
when n is 1, Y is hydrogen or an alkyl group,
when n is 2, Y is a single bond, an alkylene group, S,

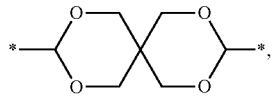

or a combination thereof,
when n is 3, Y is a single bond, a trivalent alkyl group, a trivalent phenyl group,

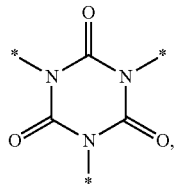

or a combination thereof,
when n is 4, Y is carbon,
* represents the bonding position.

In formula (F-1), R¹ is preferably an alkyl group having 1 to 5 carbon numbers, and more preferably a methyl group or a tertiary butyl group; m is preferably 2 or 3; Z is preferably an alkylene group having 1 to 18 carbon numbers,

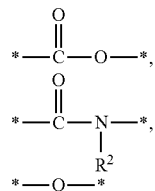

or a combination thereof; R² is preferably hydrogen.

In the formula (F-1), when n is 1, Y is preferably hydrogen or an alkyl group having 1 to 17 carbon numbers. For example, when n is 1 and Z is a methylene group (—CH₂—), Y is preferably an alkyl group having 7 to 17 carbon numbers; or when n is 1 and Y is hydrogen, Z is preferably an alkylene group having 8 to 18 carbon numbers.

In the formula (F-1), when n is 2 and Y is an alkylene group, Y is preferably an alkylene group having 4 to 6 carbon numbers, and more preferably a hexylene group or a butylene group.

In the formula (F-1), when n is 3 and Y is a trivalent alkyl group, Y is preferably a trivalent alkyl group having 4 to 6 carbon numbers, and more preferably a trivalent hexylene group or a trivalent butyl group; when n is 3 and Y is a trivalent phenyl group, Y is preferably a trivalent phenyl group substituted with an alkyl group, and more preferably a trivalent phenyl group substituted with a methyl group.

Preferred specific examples of the compound represented by the formula (F-1) include compounds represented by the following formula (f-1) to (f-13). The compound represented by formula (F-1) may be adopted in a single compound or a combination of multiple compounds.

Formula (f-1)

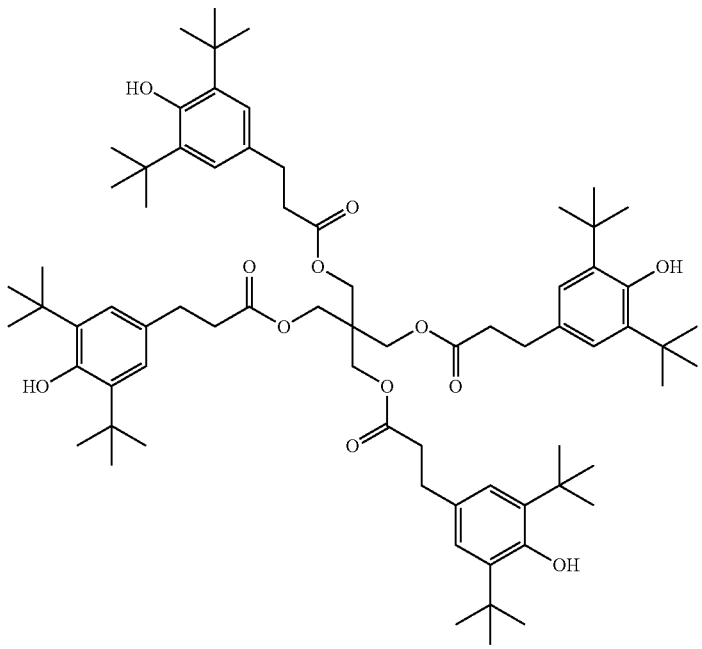

Formula (f-2)
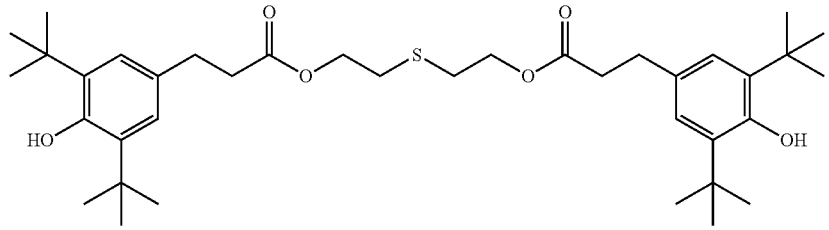
Formula (f-3)
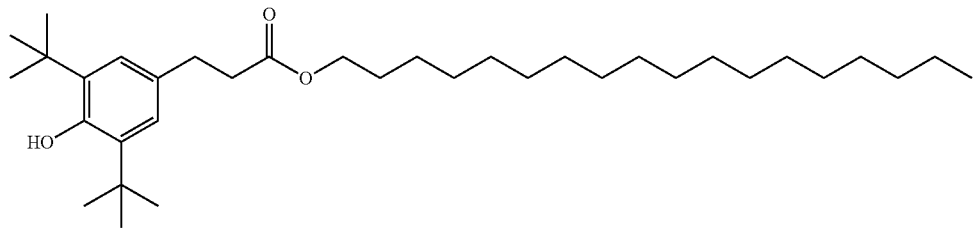
Formula (f-4)
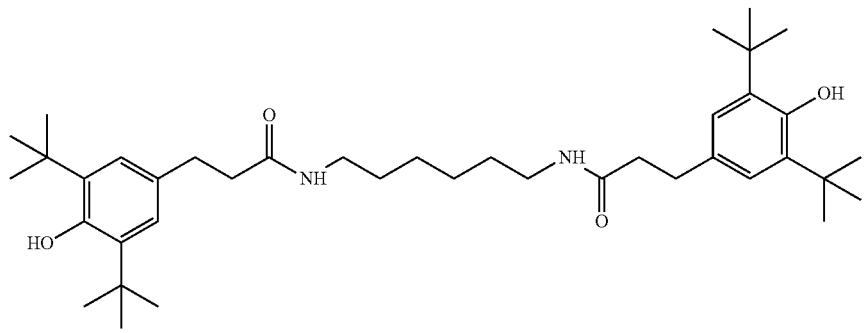
Formula (f-5)
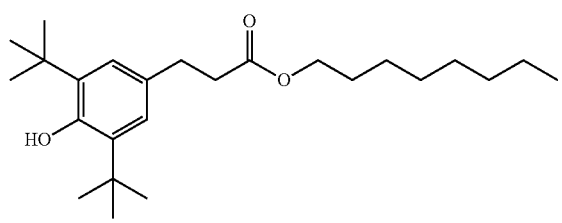
Formula (f-6)
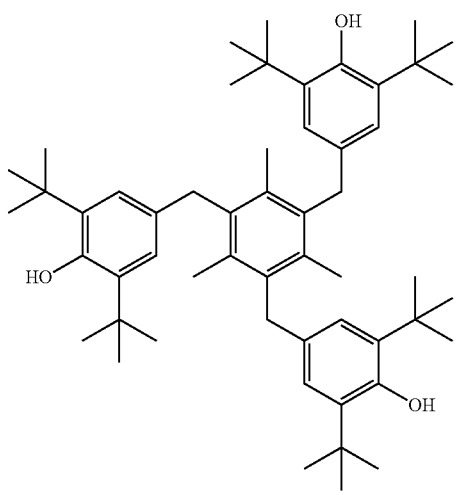

Formula (f-7)
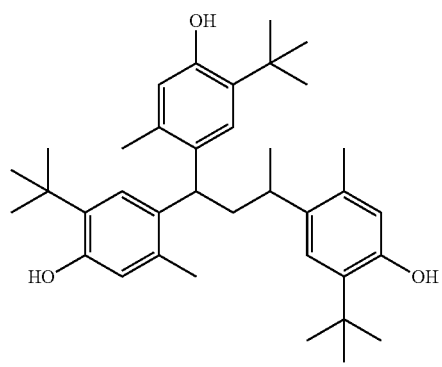
Formula (f-8)
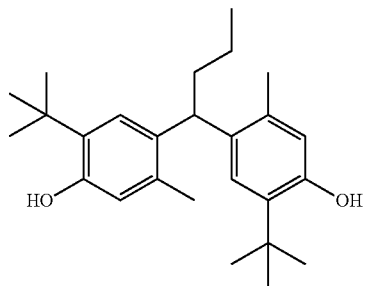
Formula (f-9)
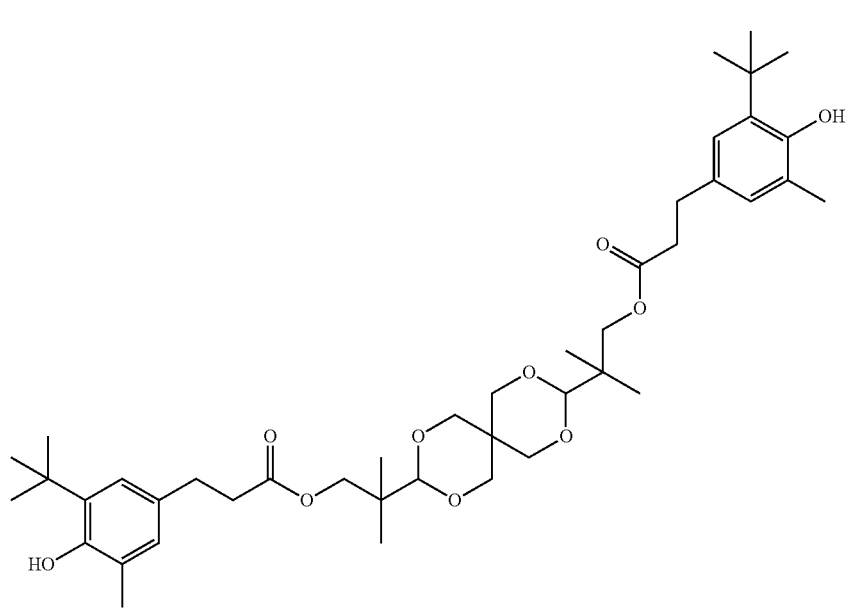
Formula (f-10)
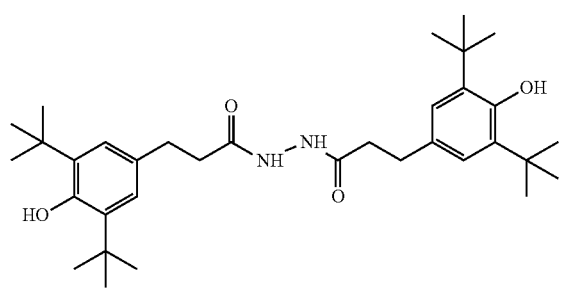
Formula (f-11)
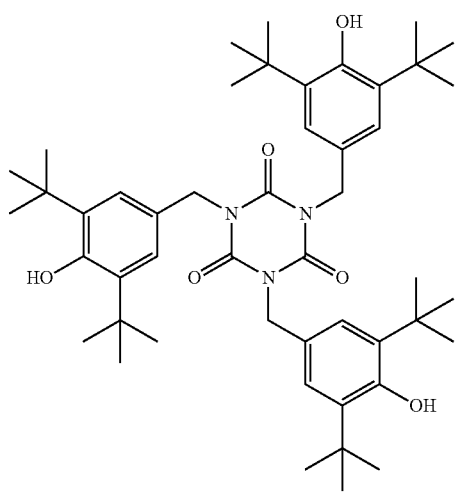

Formula (f-12)

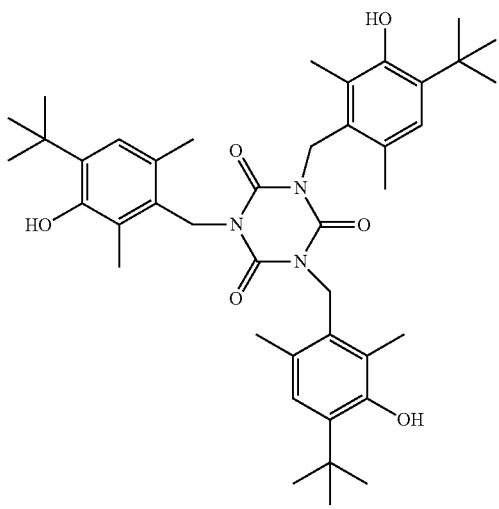

Formula (f-13)

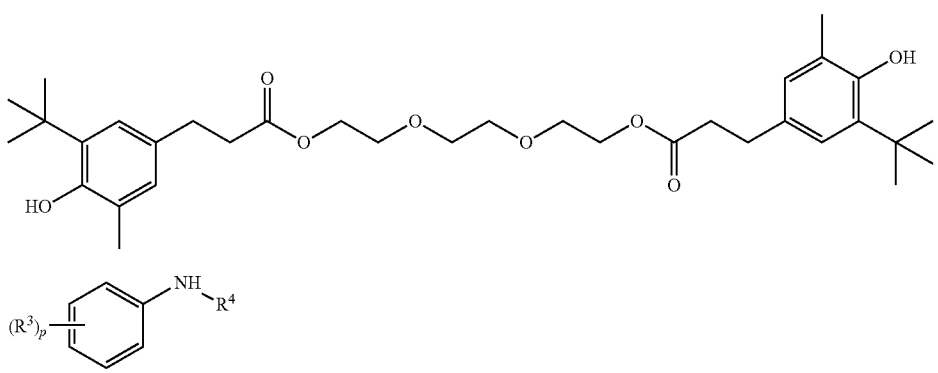

Formula (F-2)

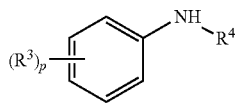

In formula (F-2), $R^3$ is an alkyl group, $R^4$ is hydrogen or a phenyl group, and p is 0 or 1.

In the formula (F-2), $R^3$ is preferably an unsubstituted or phenyl-substituted alkyl group, and more preferably an unsubstituted or phenyl-substituted alkyl group having 3 to 8 carbon numbers; $R^4$ is preferably hydrogen, an unsubstituted phenyl group, an alkyl-substituted phenyl group or a phenylalkyl-substituted phenyl group, and more preferably hydrogen, an unsubstituted phenyl group, a butylphenyl group or a phenylpropyl-substituted phenyl group.

Preferred specific examples of the compound represented by the formula (F-2) include compounds represented by the following formula (f-14) to formula (f-16). The compound represented by formula (F-2) may be adopted in a single compound or a combination of multiple compounds.

Formula (f-14)

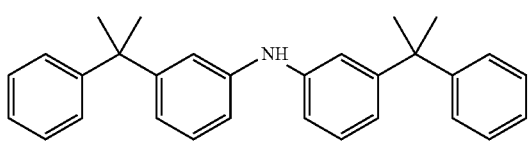

Formula (f-15)

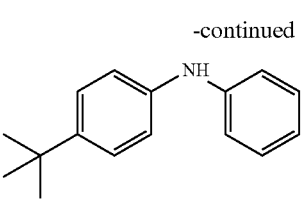

Formula (f-16)

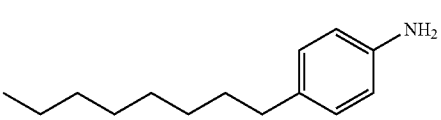

The phenyl-based compound is preferably at least one selected from the group consisting of compounds represented by formula (f-1) to formula (f-16).

The phosphorus-based compound may include a phosphite lipid-based antioxidant. The phosphorus-based compounds may be adopted in a single compound or a combination of multiple compounds. Preferred specific examples of phosphorus-based compounds include the compounds represented by the following formula (f-17) to formula (f-19), and the chemical structure is as follows:

Formula (f-17)

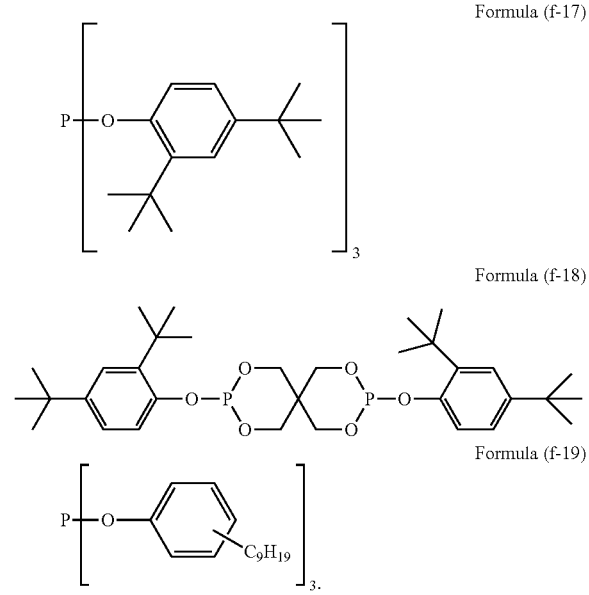

Formula (f-18)

Formula (f-19)

The sulfur-based compound may include a thioester-based antioxidant. The sulfur-based compound may be adopted in a single compound or a combination of multiple compounds. Preferred specific examples of sulfur-based compounds include the compounds represented by the following formula (f-20) to formula (f-22), and the chemical structure is as follows:

Formula (f-20)

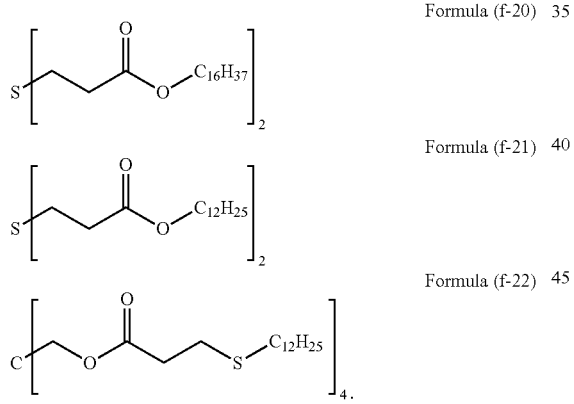

Formula (f-21)

Formula (f-22)

In one or more embodiments of the disclosure, an additive (F) may be further added. Based on the total amount of 100 parts by weight of the ink composition, the amount of the additive (F) may be 0.05 to 5 parts by weight.

When the phenyl-based compound used in the additive (F) in the ink composition includes at least one of the compound represented by formula (F-1) and the compound represented by formula (F-2), the compound represented by formula (F-1) and/or the hydroxyl group (—OH) and/or amine group (—NH—) in the compound represented by formula (F-2) can be adopted to react with the free radicals generated by the photopolymerization initiator in the ink composition, so as to reduce the reaction between the free radicals and other components in the ink composition, thereby obtaining an ink composition with good viscosity stability.

Scatterer (G)

The ink composition may further include a scatterer (G). In one or more embodiments of the disclosure, the scatterer (G) may include at least one selected from the group consisting of titanium dioxide, silicon dioxide, barium titanate, zirconium oxide, zinc oxide, and aluminum oxide. The scatterer (G) may be adopted in a single scatterer or a combination of multiple scatterers.

In one or more embodiments of the disclosure, a scatterer (G) may be further added. Based on a total amount of 100 parts by weight of the ink composition, the amount of the scatterer (G) is 0.1 to 10 parts by weight.

When the ink composition further includes a scatterer (G), the scatterer (G) can reflect light (such as blue light) not absorbed by the quantum dots (A) to increase the possibility of light being absorbed by the quantum dots. In this manner, the light absorption rate and light conversion efficiency of the light conversion layer formed by the ink composition are improved.

<Preparation Method of Ink Composition>

There is no specific limitation to the preparation method of the ink composition. For example, the quantum dot (A), the first resin (B1), the second resin (B2), the ethylenically unsaturated monomer (C), the initiator (D), and the solvent (E) are placed in a blender to stir so as to be uniformly mixed into a solution state. If necessary, additives (F) and scatterers (G) can also be added. After they are mixed uniformly, a liquid ink composition can be obtained.

<Manufacturing Method of Light Conversion Layer>

An exemplary embodiment of the disclosure provides a light conversion layer formed by using the ink composition described above.

After the ink composition is coated on the substrate to form a coating film, a pre-exposure baking (i.e., pre-baking) step is performed at a temperature of 100° C. for 5 minutes to form a thin film. Next, a high-pressure mercury lamp is used to expose the pre-baked coating film with light of 100 mJ/cm$^2$. Then, post-baking is performed at 150° C. for 20 minutes to form a light conversion layer on the substrate.

The substrate may be a glass substrate, a plastic base material (for example, a polyethersulfone (PES) plate, a polycarbonate (PC) plate or a polyimide (PI) film) or other light-transmissive substrates, the disclosure provides no limitation thereto.

There is no specific limitation to the coating method, but a spray coating method, a roll coating method, a spin coating method, or the like can be used. Moreover, generally the spin coating method is commonly used. In addition, a coating film is formed, and then in some cases, residual solvent can be partially removed under reduced pressure.

In this embodiment, the light conversion layer further includes a red pattern layer, a green pattern layer, and a scatterer pattern layer. The red pattern layer includes red quantum dots. The green pattern layer includes green quantum dots. The scatterer pattern layer does not contain quantum dots.

<Light Emitting Device>

An exemplary embodiment of the disclosure provides a light emitting device including the above-mentioned light conversion layer.

FIG. 1 is a schematic diagram of a light emitting device according to an embodiment of the disclosure. The light emitting device 10 includes a substrate 120, a light conversion layer 160 and a backlight module 200. In this embodiment, the light emitting device 10 may further include a filter layer 140. The light emitting device 10 may further include a polarizing plate, an alignment film, a liquid crystal (not shown), or other elements known to those with ordinary knowledge in the art, no further description is incorporated herein.

In this embodiment, the substrate 120 is a light-transmissive substrate. The material of the substrate 120 may be glass, organic polymer (for example, polyimide (PI), polyethersulfone (PES), or polycarbonate (PC)) or other suitable materials.

The filter layer 140 is located under the substrate 120. In this embodiment, the filter layer 140 includes, for example, a red filter pattern 142, a green filter pattern 144, and a blue filter pattern 146, and each of the filter patterns preferably has a light-shielding pattern 148 therebetween. The red filter pattern 142, the green filter pattern 144, and the blue filter pattern 146 contain no quantum dots.

The light conversion layer 160 is located under the filter layer 140. The filter layer 140 is located between the substrate 120 and the light conversion layer 160. The light conversion layer 160 is a light conversion layer formed by using the ink composition described above. In this embodiment, the light conversion layer 160 includes a red pattern layer 162, a green pattern layer 164, and a scatterer pattern layer 166, and a bank layer 168 is preferably provided between each of the pattern layers. The red pattern layer 162 includes red quantum dots. The green pattern layer 164 includes green quantum dots. The scatterer pattern layer 166 does not contain quantum dots. In this embodiment, the red pattern layer 162 of the light conversion layer 160 is opposite to the red filter pattern 142 of the filter layer 140, and the green pattern layer 164 of the light conversion layer 160 is opposite to the green filter pattern 144 of the filter layer 140. The scatterer pattern layer 166 of the light conversion layer 160 is opposite to the blue filter pattern 146 of the filter layer 140. For example, the red pattern layer 162 is located under the red filter pattern 142, the green pattern layer 164 is located under the green filter pattern 144, and the scatterer pattern layer 166 is located under the blue filter pattern 146.

The backlight module 200 is disposed on one side of the substrate 120 where the light conversion layer 160 is disposed. The backlight module 200 irradiates the light conversion layer 160 with light. For example, the backlight module 200 is suitable for providing a light source, and the light emitted by the light source passes through the light conversion layer 160, the filter layer 140, and the substrate 120 in sequence to provide a converted light source. In this embodiment, the types of light sources used by the backlight module 200 may include organic light emitting diodes (OLED), micro-LEDs or other suitable light sources. In this embodiment, the backlight module 200 is a light source emitting blue light. After the blue light emitted by the backlight module 200 is absorbed by the red quantum dots in the red pattern layer 162 and the green quantum dots in the green pattern layer 164, the converted light can be emitted from the red pattern layer 162 and the green pattern layer 164 respectively, and then respectively pass through the red filter pattern 142 and the green filter pattern 144 of the filter layer 140 to emit red light and green light. The blue light emitted by the backlight module 200 directly passes through the scatterer pattern layer 166 that is free of quantum dots to emit blue light, and then passes through the blue filter pattern 146 of the filter layer 140 to emit blue light. For example, when the light emitted by the light source through the light conversion layer 160 and the filter layer 140 includes visible light (such as red light, green light, and blue light), the light emitting device 10 can be applied to a display device or other suitable devices. In this manner, compared with the conventional display device, the display device of the light emitting device 10 including the light conversion layer formed of the ink composition can exhibit better brightness and color purity. For example, when the light emitted by the light source through the light conversion layer 160 and the filter layer 140 includes near-infrared light (for example, the wavelength is about 780 nm to 800 nm), the light emitting device 10 can be applied to an electromagnetic radiation device or other suitable devices.

Figure 2:
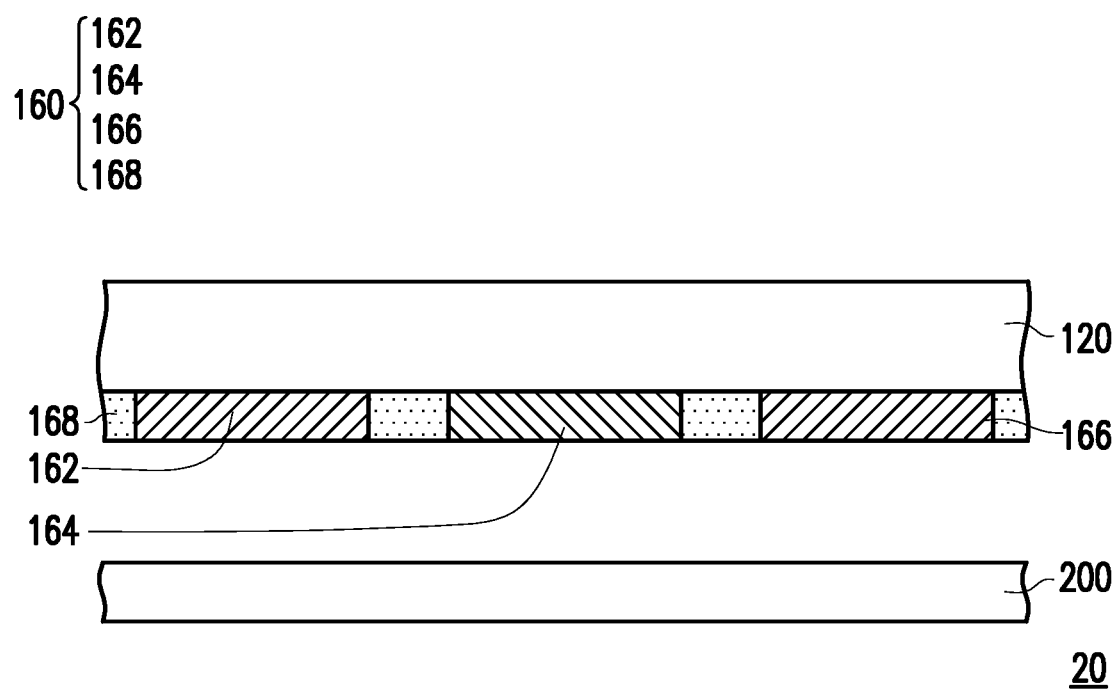
FIG. 2 is a schematic diagram of a light emitting device according to another embodiment of the disclosure.

FIG. 2 is a schematic diagram of a light emitting device according to another embodiment of the disclosure. It should be noted here that the embodiment of FIG. 2 uses the element numbers and part of the content in the embodiment of FIG. 1, and the same or similar reference numbers are used to represent the same or similar elements, and the description of the same technical content is omitted. For the description of the omitted parts, reference may be derived from the foregoing embodiments, and no further description is incorporated herein.

The main difference between the embodiment of FIG. 2 and the embodiment of FIG. 1 is that the light emitting device 20 does not have the filter layer 140.

Please refer to FIG. 2, the light emitting device 20 includes a substrate 120, a light conversion layer 160, and a backlight module 200. In this embodiment, the light conversion layer 160 is located on the substrate 120, and there is no filter layer containing no quantum dots between the light conversion layer 160 and the substrate 120.

In this embodiment, the light emitted by the light source provided by the backlight module 200 passes through the light conversion layer 160 and the substrate 120 in sequence to provide a converted light source. After the blue light emitted by the backlight module 200 is absorbed by the red quantum dots in the red pattern layer 162 and the green quantum dots in the green pattern layer 164, converted light can be emitted from the red pattern layer 162 and the green pattern layer 164 respectively. The blue light emitted by the backlight module 200 directly passes through the scatterer pattern layer 166 containing no quantum dots to emit blue light. For example, when the light emitted by the light source through the light conversion layer 160 includes visible light (such as red light, green light, and blue light), the light emitting device 20 can be applied to a display device or other suitable devices. In this manner, compared with the conventional display device and/or the above-mentioned display device including the light emitting device 10, the display device including the light emitting device 20 not only can exhibit better brightness and color purity, but also can omit the manufacturing step of a filter layer to reduce the manufacturing cost of the display device. For example, when the light emitted by the light source through the light conversion layer 160 includes near-infrared light (for example, the wavelength is about 780 nm to 800 nm), the light emitting device 20 can be applied to an electromagnetic radiation device or other suitable devices.

Hereinafter, the disclosure will be described in detail with reference to examples. The following examples are provided to describe the disclosure, and the scope of the disclosure includes the scope described in claims of the disclosure and their substitutions and modifications, and is not limited to the scope of the examples.

EXAMPLES OF INK COMPOSITION AND LIGHT CONVERSION LAYER

Examples 1 to 22 and Comparative Examples 1 to 8 of the ink composition and the light conversion layer will be described below.

Example 1 a. Ink Composition 6.3 parts by weight of cadmium selenide-based green quantum dots, 4 parts by weight of curable resin B-1, 4 parts by weight of B-2, 3 parts by weight of C-1, 4 parts by weight of C-2, 0.6 part by weight of OXE-01 (manufactured by BASF), and 0.1 part by weight of CXC-1612 (manufactured by King Industries) are added with 39 parts by weight of E-1 (ethylene glycol monoethyl ether acetate (EDGAC) (CAS Number: 112-15-2)) and 39 parts by weight of E-3 (propylene glycol monomethyl ether acetate (PGMEA) (CAS Number: 108-65-6)) and stirred uniformly with a blender. Then, the ink composition of Example 1 can be obtained.

b. Light Conversion Layer

The ink compositions prepared in the examples are coated on the substrate by the spin coating method (spin coater model MS-A150, manufactured by MIKASA, with a rotation speed of about 200 rpm). Next, prebaking is performed at a temperature of 100° C. for 5 minutes to form a thin film. Then, a high-pressure mercury lamp (model UX-1000SM-ANC01, manufactured by Ushio, Inc.) containing g, h, i, and i$^+$ line is used to perform exposure on the prebaked coating film with a light of 100 mJ/cm$^2$. Afterwards, post-baking is performed at 150° C. for 20 minutes to obtain a light conversion layer having a thickness of 6 μm. The prepared light conversion layer is evaluated through each of the following evaluation methods, and the results are shown in Table 3.

Example 2 to Example 22 and Comparative Example 1 to Comparative Example 8

The ink compositions of Example 2 to Example 22 and Comparative Example 1 to Comparative Example 8 are prepared in the same steps as in Example 1, and the difference lies in: the types of components and amount of the components used in the ink composition are changed (as shown in Table 2). The components/compounds corresponding to the labels in Table 2 are shown in Table 1. The prepared ink composition is made into a light conversion layer and evaluated through the following evaluation methods. The results are shown in Table 3.

TABLE 1
| | Label | components/compounds |
|---|---|---|
| Quantum dot (A) | A-1 | Cadmium selenide-based green quantum dots |
| | A-2 | Cadmium selenide-based red quantum dots |
| Resin (B) | B-1 | Curing resin B-1 |
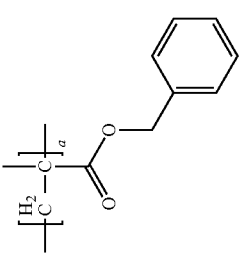
a accounts for 45-65%, b accounts for 10%~30%, c accounts for 5%~25%

TABLE 1-continued
| Label | components/compounds |
|---|---|
| B-2 | 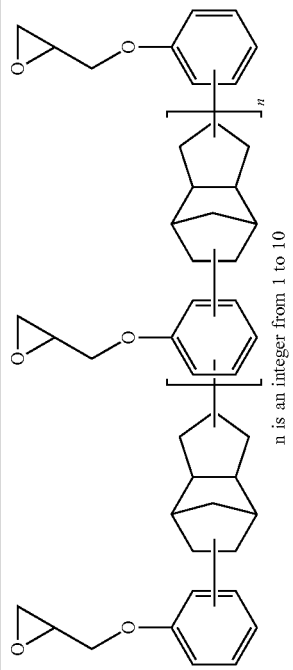 n is an integer from 1 to 10 |
| B-3 | 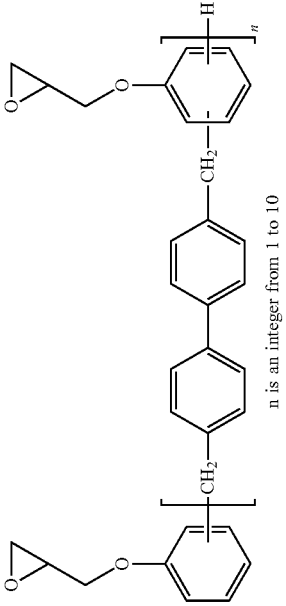 n is an integer from 1 to 10 |
| B-4 | 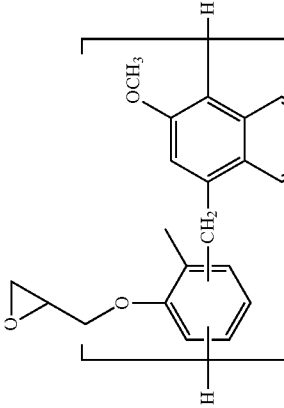 n is an integer from 1 to 10 |

TABLE 1-continued
| Label | components/compounds |
|---|---|
| B-5 | 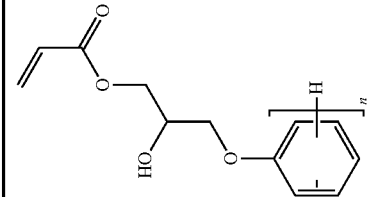 |
| B-6 | 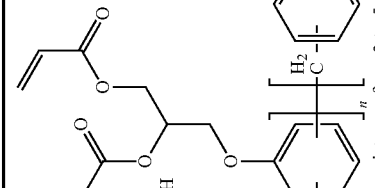 |
| C-1 ethylenically unsaturated monomer (C) | 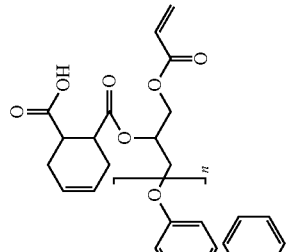 |

TABLE 1-continued
| Label | components/compounds |
|---|---|
| C-2 |  |
| C-3 | 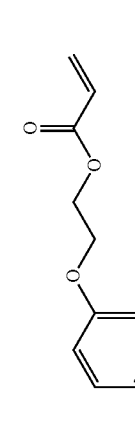 |
| C-4 | 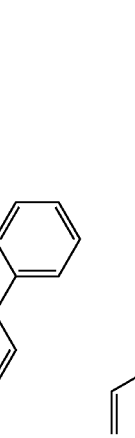 |
| C-5 | 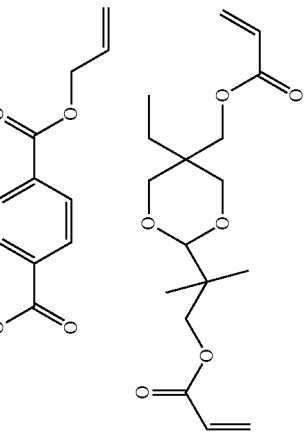 |
| C-6 | Mixture of 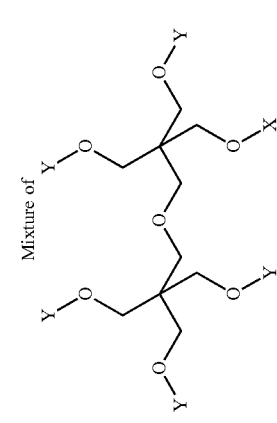 |

TABLE 1-continued

| Label | components/compounds |
|---|---|
| C-7 | 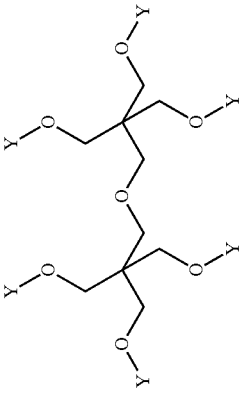 X = H, Y = (acryloyl group) |
| C-8 | 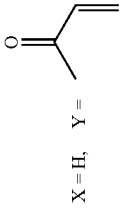 n is an integer from 7 to 8 |
| initiator (D) | D-1 OXE-01 (manufactured by BASF) |
| | D-2 CXC-1612 (manufactured by King Industries) |
| solvent (E) | E-1 ethylene glycol monoethyl ether acetate (EDGAC)(CAS Number: 112-15-2) |
| | E-2 diethylene glycol monobutyl ether acetate (BDGAC)(CAS Number: 124-17-4) |
| | E-3 propylene glycol monomethyl ether acetate (PGMEA)(CAS Number: 108-65-6) |

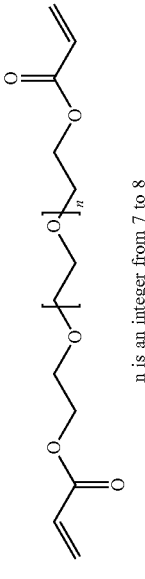

TABLE 2

| Ingredients (unit: parts by weight) | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Quantum dot (A) | A-1 | 6.3 | 6.3 | 6.3 | 6.3 | 6.3 | 6.3 | 6.3 | 6.3 | 6.3 | 6.3 | 6.3 |
| | A-2 | — | — | — | — | — | — | — | — | — | — | — |
| Resin (B) | B-1 | 4 | 4 | 4 | 4 | 4 | 4 | 4 | 4 | 4 | 4 | 4 |
| | B-2 | 4 | 4 | 4 | 4 | 4 | 4 | 4 | — | — | — | — |
| | B-3 | — | — | — | — | — | — | — | 4 | 4 | — | — |
| | B-4 | — | — | — | — | — | — | — | — | — | 4 | 4 |
| | B-5 | — | — | — | — | — | — | — | — | — | — | — |
| | B-6 | — | — | — | — | — | — | — | — | — | — | — |
| ethylenically unsaturated monomer (C) | C-1 | 3 | 3 | 3 | 3 | 3 | 3 | 3 | 3 | 3 | 3 | 3 |
| | C-2 | 4 | 4 | — | — | — | 2 | — | 2 | — | 2 | — |
| | C-3 | — | — | 4 | — | — | 2 | — | 2 | — | 2 | — |
| | C-4 | — | — | — | 4 | — | — | 2 | — | 2 | — | 2 |
| | C-5 | — | — | — | — | 4 | — | 2 | — | 2 | — | 2 |
| | C-6 | — | — | — | — | — | — | — | — | — | — | — |
| | C-7 | — | — | — | — | — | — | — | — | — | — | — |
| | C-8 | — | — | — | — | — | — | — | — | — | — | — |
| initiator (D) | D-1 | 0.6 | 0.6 | 0.6 | 0.6 | 0.6 | 0.6 | 0.6 | 0.6 | 0.6 | 0.6 | 0.6 |
| | D-2 | 0.1 | 0.1 | 0.1 | 0.1 | 0.1 | 0.1 | 0.1 | 0.1 | 0.1 | 0.1 | 0.1 |
| solvent (E) | E-1 | 39 | — | 39 | 39 | 39 | 39 | 39 | 39 | 39 | 39 | 39 |
| | E-2 | — | 39 | — | — | — | — | — | — | — | — | — |
| | E-3 | 39 | 39 | 39 | 39 | 39 | 39 | 39 | 39 | 39 | 39 | 39 |

| Ingredients (unit: parts by weight) | | Examples | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Quantum dot (A) | A-1 | — | — | — | — | — | — | — | — | — | — | — |
| | A-2 | 6.3 | 6.3 | 6.3 | 6.3 | 6.3 | 6.3 | 6.3 | 6.3 | 6.3 | 6.3 | 6.3 |
| Resin (B) | B-1 | 4 | 4 | 4 | 4 | 4 | 4 | 4 | 4 | 4 | 4 | 4 |
| | B-2 | 4 | 4 | 4 | 4 | 4 | 4 | 4 | — | — | — | — |
| | B-3 | — | — | — | — | — | — | — | 4 | 4 | — | — |
| | B-4 | — | — | — | — | — | — | — | — | — | 4 | 4 |
| | B-5 | — | — | — | — | — | — | — | — | — | — | — |
| | B-6 | — | — | — | — | — | — | — | — | — | — | — |
| ethylenically unsaturated monomer (C) | C-1 | 3 | 3 | 3 | 3 | 3 | 3 | 3 | 3 | 3 | 3 | 3 |
| | C-2 | 4 | 4 | — | — | — | 2 | — | 2 | — | 2 | — |
| | C-3 | — | — | 4 | — | — | 2 | — | 2 | — | 2 | — |
| | C-4 | — | — | — | 4 | — | — | 2 | — | 2 | — | 2 |
| | C-5 | — | — | — | — | 4 | — | 2 | — | 2 | — | 2 |
| | C-6 | — | — | — | — | — | — | — | — | — | — | — |
| | C-7 | — | — | — | — | — | — | — | — | — | — | — |
| | C-8 | — | — | — | — | — | — | — | — | — | — | — |
| initiator (D) | D-1 | 0.6 | 0.6 | 0.6 | 0.6 | 0.6 | 0.6 | 0.6 | 0.6 | 0.6 | 0.6 | 0.6 |
| | D-2 | 0.1 | 0.1 | 0.1 | 0.1 | 0.1 | 0.1 | 0.1 | 0.1 | 0.1 | 0.1 | 0.1 |
| solvent (E) | E-1 | 39 | — | 39 | 39 | 39 | 39 | 39 | 39 | 39 | 39 | 39 |
| | E-2 | — | 39 | — | — | — | — | — | — | — | — | — |
| | E-3 | 39 | 39 | 39 | 39 | 39 | 39 | 39 | 39 | 39 | 39 | 39 |

| Ingredients (unit: parts by weight) | | Comparative examples | | | | | | | |
|---|---|---|---|---|---|---|---|---|---|
| | | 1 | 2 | 3 | 4 | 5 | 6 | 7 | 8 |
| Quantum dot (A) | A-1 | 6.3 | 6.3 | 6.3 | 6.3 | — | — | — | — |
| | A-2 | — | — | — | — | 6.3 | 6.3 | 6.3 | 6.3 |
| Resin (B) | B-1 | 4 | 4 | 4 | 4 | 4 | 4 | 4 | 4 |
| | B-2 | 4 | — | — | — | 4 | — | — | — |
| | B-3 | — | — | — | — | — | — | — | — |
| | B-4 | — | — | — | — | — | — | — | — |
| | B-5 | — | 4 | — | 2 | — | 4 | — | 2 |
| | B-6 | — | — | 4 | 2 | — | — | 4 | 2 |
| ethylenically unsaturated monomer (C) | C-1 | 3 | — | — | — | 3 | — | — | — |
| | C-2 | 2 | — | — | — | 2 | — | — | — |
| | C-3 | 2 | — | — | — | 2 | — | — | — |
| | C-4 | — | — | — | — | — | — | — | — |
| | C-5 | — | — | — | — | — | — | — | — |
| | C-6 | — | 3 | 3 | 3 | — | 3 | 3 | 3 |
| | C-7 | — | 2 | 2 | 2 | — | 2 | 2 | 2 |
| | C-8 | — | 2 | 2 | 2 | — | 2 | 2 | 2 |
| initiator (D) | D-1 | 0.6 | 0.7 | 0.7 | 0.7 | 0.6 | 0.7 | 0.7 | 0.7 |
| | D-2 | 0.1 | — | — | — | 0.1 | — | — | — |
| solvent (E) | E-1 | — | 39 | 39 | 39 | — | 39 | 39 | 39 |
| | E-2 | — | — | — | — | — | — | — | — |
| | E-3 | 78 | 39 | 39 | 39 | 78 | 39 | 39 | 39 |

<Evaluation Method>
a. Light Resistance

The prepared light conversion layer is irradiated with a blue backlight source (emission wavelength λ: 450 nm; luminance: 10000 nits) for 24 hours, and the external quantum efficiency (EQE) is measured before and after the irradiation to calculate the external quantum EQE remaining ratio for evaluation of light resistance.

External quantum efficiency measurement method:

In this disclosure, a fluorescence spectrometer (Model Flame-S-XR1-ES, manufactured by Ocean Optics, Inc.) is used for measurement. Specifically, the bare glass is placed on a blue backlight source and the total number of blue photons are measured by using the fluorescence spectrometer. Then the light conversion layer is placed on the blue light source and measured, so as to obtain the total number of red or green photons emitted by the quantum dots after light conversion. The EQE and the EQE remaining ratio are calculated by the following equation.

The EQE of the red light conversion layer=(Total number of red photons/Total number of blue photons)×100(%)

The EQE of the green light conversion layer=(Total number of green photons/Total number of blue photons)×100(%)

EQE remaining ratio=(EQE after 24 hrs of irradiation with blue light/EQE after 0 hrs of irradiation with blue light)×100(%)

b. Weather Resistance

The prepared light conversion layer is placed in an environment with a temperature of 60° C. and a humidity of 90% for 24 hours, and the EQE is measured before and after the weather resistance test, and the EQE remaining ratio is calculated for evaluation of weather resistance.

EQE remaining ratio=(EQE after weather resistance test/EQE before weather resistance test)×100 (%)

c. Ink Jetting Stability Evaluation

A nano-material jet printer (Model DMP-2850, manufactured by Fuji Film Dimatix) is adopted. The ink cartridge of the jet printer has 16 nozzles, and the volume of ink composition that each nozzle jetted per time is 10 pL. The ink composition is continuously jetted for 10 minutes, and the ink jetting stability is evaluated according to the following criteria.

⊚: More than 12 out of 16 nozzles can jet ink stably

◯: The number of nozzles capable of jetting ink stably is between 8 and 11

X: The number of nozzles capable of jetting ink stably is less than 8

An ink viewing device is adopted to confirm the droplet flight trajectory. If the flight trajectory is vertically downward and no droplet separation occurs, it can be considered as stable ink jet.

TABLE 3

|  | Light resistance | | | Weather resistance | | | |
| --- | --- | --- | --- | --- | --- | --- | --- |
|  | EQE before test (%) | EQE after test (%) | EQE remaining ratio (%) | EQE before test (%) | EQE after test (%) | EQE remaining ratio (%) | Ink jetting stability |
| Example 1 | 57.8% | 29.3% | 50.7% | 57.2% | 51.7% | 90.4% | ⊚ |
| Example 2 | 57.1% | 29.0% | 50.8% | 57.2% | 51.8% | 90.6% | ⊚ |
| Example 3 | 56.6% | 30.7% | 54.2% | 57.0% | 50.5% | 88.6% | ⊚ |
| Example 4 | 57.3% | 28.9% | 50.4% | 57.2% | 50.1% | 87.6% | ⊚ |
| Example 5 | 57.8% | 29.5% | 51.0% | 58.1% | 50.6% | 87.1% | ⊚ |
| Example 6 | 57.4% | 31.1% | 54.2% | 58.7% | 51.0% | 86.9% | ⊚ |
| Example 7 | 56.8% | 28.9% | 50.9% | 57.8% | 50.5% | 87.4% | ⊚ |
| Example 8 | 58.6% | 29.6% | 50.5% | 59.3% | 52.2% | 88.0% | ⊚ |
| Example 9 | 57.5% | 29.2% | 50.8% | 58.5% | 51.9% | 88.7% | ⊚ |
| Example 10 | 56.7% | 28.9% | 51.0% | 57.0% | 50.3% | 88.2% | ⊚ |
| Example 11 | 56.3% | 28.3% | 50.3% | 56.5% | 50.2% | 88.8% | ⊚ |
| Example 12 | 62.3% | 59.4% | 95.3% | 61.6% | 61.6% | 100.0% | ⊚ |
| Example 13 | 61.5% | 59.0% | 95.9% | 61.7% | 61.3% | 99.4% | ⊚ |
| Example 14 | 62.0% | 60.0% | 96.8% | 62.4% | 62.1% | 99.5% | ⊚ |
| Example 15 | 61.0% | 58.5% | 95.9% | 61.4% | 61.5% | 100.2% | ⊚ |
| Example 16 | 61.2% | 58.7% | 95.9% | 62.0% | 62.2% | 100.3% | ⊚ |
| Example 17 | 62.3% | 60.1% | 96.5% | 62.6% | 62.6% | 100.0% | ⊚ |
| Example 18 | 61.5% | 58.7% | 95.4% | 61.1% | 60.6% | 99.2% | ⊚ |
| Example 19 | 61.8% | 58.9% | 95.3% | 62.6% | 62.1% | 99.2% | ⊚ |
| Example 20 | 61.4% | 59.3% | 96.6% | 61.0% | 61.4% | 100.7% | ⊚ |
| Example 21 | 62.0% | 58.8% | 94.8% | 61.2% | 61.1% | 99.8% | ⊚ |
| Example 22 | 60.9% | 58.3% | 95.7% | 61.8% | 61.3% | 99.2% | ⊚ |
| Comparative Example 1 | 56.0% | 21.1% | 37.7% | 56.6% | 37.7% | 66.6% | X |
| Comparative Example 2 | 56.8% | 22.2% | 39.1% | 56.5% | 38.7% | 68.5% | ⊚ |
| Comparative Example 3 | 55.3% | 20.0% | 36.2% | 54.0% | 36.2% | 67.0% | ⊚ |
| Comparative Example 4 | 56.5% | 20.7% | 36.6% | 56.2% | 37.0% | 65.8% | ⊚ |
| Comparative Example 5 | 61.1% | 53.7% | 87.9% | 60.5% | 57.2% | 94.5% | X |
| Comparative Example 6 | 60.6% | 52.1% | 86.0% | 60.8% | 57.9% | 95.2% | ⊚ |
| Comparative Example 7 | 61.8% | 54.6% | 88.3% | 62.0% | 57.1% | 92.1% | ⊚ |

TABLE 3-continued

|  | Light resistance | | | Weather resistance | | | |
| --- | --- | --- | --- | --- | --- | --- | --- |
|  | EQE before test (%) | EQE after test (%) | EQE remaining ratio (%) | EQE before test (%) | EQE after test (%) | EQE remaining ratio (%) | Ink jetting stability |
| Comparative Example 8 | 61.2% | 53.5% | 87.4% | 61.8% | 58.2% | 94.2% | ◎ |

Evaluation Results

Table 2 and Table 3 show that Examples 1 to 11 and Comparative Examples 1 to 4 are green light conversion layer, and Examples 12 to 22 and Comparative Examples 5 to 8 are red light conversion layer. Compared with the green quantum dots, the red quantum dots have better water vapor and oxygen resistance and better EQE remaining ratio in terms of light resistance and weather resistance.

Examples 1 to 11 use the first resin (B1) as an alkali-insoluble resin and the second resin (B2) as an alkali-soluble resin in combination. Therefore, the EQE remaining ratio in terms of light resistance and weather resistance is higher than that of Comparative Examples 1 to 4. Similarly, Examples 12 to 22 use the first resin (B1) as an alkali-insoluble resin and the second resin (B2) as an alkali-soluble resin in combination. Therefore, the EQE remaining ratio in terms of light resistance and weather resistance is higher than that of Comparative Examples 5 to 8. It can be seen that by using the combination of resins and monomers with water vapor and oxygen resistance function, the quantum dots are protected from water vapor and oxygen, and fluorescence decay can be avoided, thus improving the light resistance and weather resistance of the quantum dot light conversion layer. However, since Comparative Example 1 and Comparative Example 5 only use propylene glycol monomethyl ether acetate (PGMEA) with a boiling point of about 145° C. as the solvent without controlling the boiling point within the range of 180° C. to 250° C., the ink jetting stability is relatively poor. With high surface tension, it is easy to maintain the shape and stability of inkjet droplets; but if the surface tension is low, the ink tends to drop directly, the ink droplets fall into pieces, and it is difficult to form uniform and stable ink droplets. In addition, the surface tension of PGMEA is only less than 26.5 mN/m, so the ink jetting stability is poor.

In summary, the ink composition of the disclosure contains both the first resin (B1) as an alkali-insoluble resin and the second resin (B2) as an alkali-soluble resin. The first resin (B1) as an alkali-insoluble resin can be cross-linked by heating and ring-opening to achieve the effect of blocking water vapor and oxygen. The function of the second resin (B2) as an alkali-soluble resin is to adjust the viscosity and improve the dispersibility of the quantum dots in the composition. Therefore, the ink composition of the disclosure has good water vapor and oxygen resistance properties, can effectively improving luminous efficiency while maintaining better dispersibility. By using the combination of the first resin (B1) and the second resin (B2) with water vapor and oxygen resistance function, the quantum dots are protected from the water vapor and oxygen, and the fluorescence decay can be avoided, thus improving the light resistance and weather resistance of the quantum dot light conversion layer. Good light resistance can be achieved under long-term exposure to light with high intensity, and good weather resistance can be achieved in high-temperature and high-humidity environments.

Although the disclosure has been disclosed in the above embodiments, it is not intended to limit the disclosure. Those with ordinary knowledge in the technical field can make some changes and modification without departing from the spirit and scope of the disclosure. Therefore, the scope of the disclosure shall be subject to the scope of the appended claims.

What is claimed is:

1. An ink composition, comprising:

a quantum dot (A);

a first resin (B1) as an alkali-insoluble resin;

a second resin (B2) as an alkali-soluble resin;

an ethylenically unsaturated monomer (C);

an initiator (D); and a solvent (E), wherein the first resin (B1) comprises a compound represented by a following formula (1),

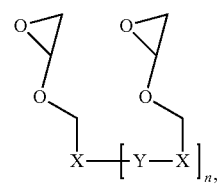

Formula (1)

in the formula (1), n is an integer from 1 to 10, X is benzene, toluene or naphthalene, and Y is toluene, methylnaphthalene, tetrahydrodicyclopentadiene, or 4,4'-dimethyl-1,1'-biphenyl, wherein based on a total amount of 100 parts by weight of the ink composition, an amount of the quantum dot (A) is 0.5 to 15 parts by weight, a total amount of the first resin (B1) and the second resin (B2) is 0.5 to 20 parts by weight, an amount of the ethylenically unsaturated monomer (C) is 0.5 to 20 parts by weight, an amount of the initiator (D) is 0.01 to 5 parts by weight, and an amount of the solvent (E) is 65 to 85 parts by weight.

2. The ink composition according to claim 1, wherein the quantum dot (A) comprises at least one selected from a group consisting of green quantum dots and red quantum dots, an emission wavelength of the green quantum dots is in a range of greater than or equal to 500 nm and less than 600 nm, an emission wavelength of the red quantum dots is in a range of greater than or equal to 600 nm and less than or equal to 800 nm.

3. The ink composition according to claim 1, wherein the first resin (B1) comprises at least one selected from a group consisting of the following compounds:

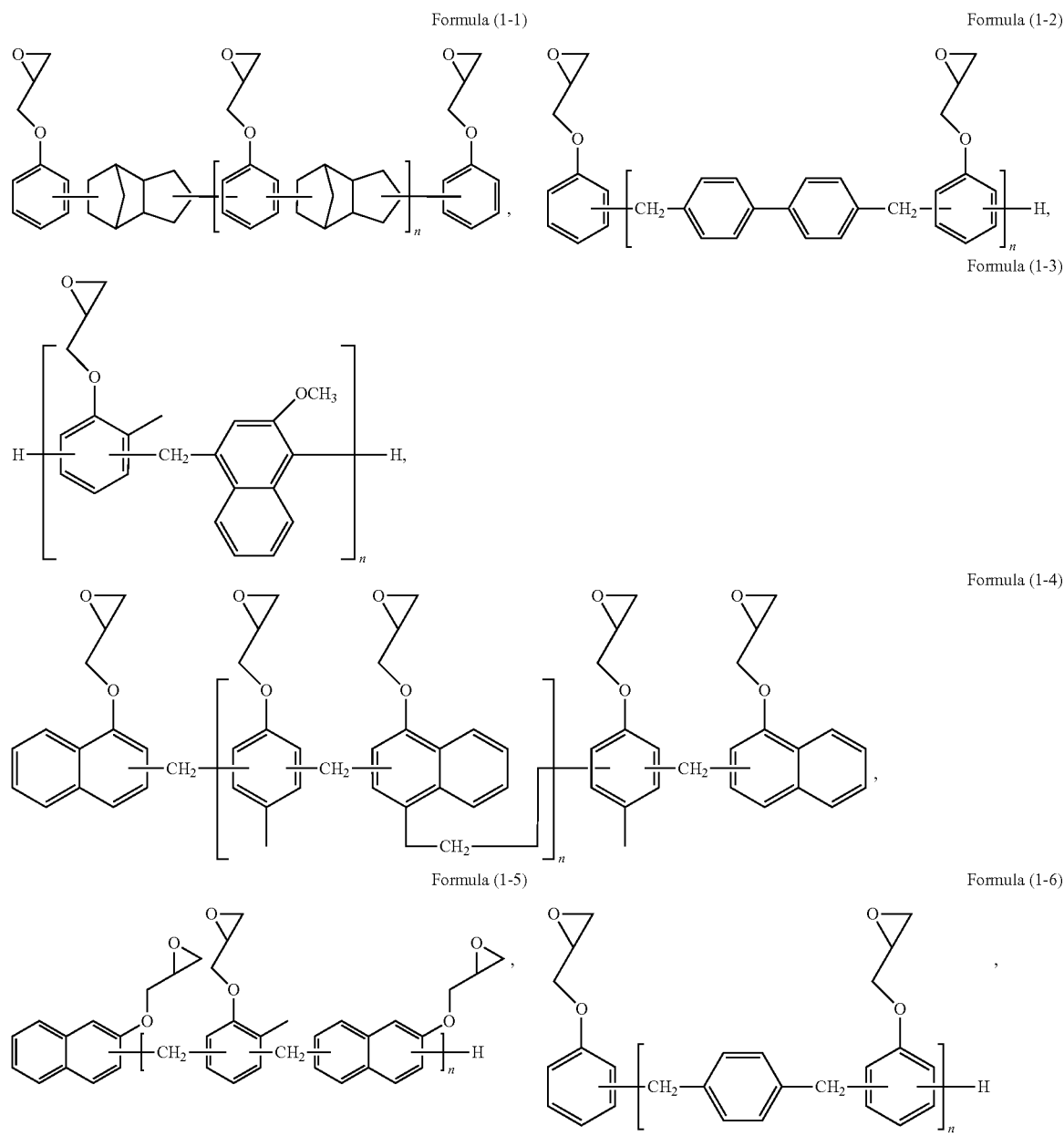

Formula (1-1), Formula (1-2), Formula (1-3), Formula (1-4), Formula (1-5), Formula (1-6)

in the formula (1-1) to the formula (1-6), n is an integer of 1-10.

4. The ink composition according to claim 1, wherein the second resin (B2) is a (meth)acrylic resin.

5. The ink composition according to claim 4, wherein the second resin (B2) is composed of one or more monomers selected from (meth)acrylic acid, alkyl (meth)acrylate, hydroxyl-containing (meth)acrylate, ether-containing (meth)acrylate, alicyclic (meth)acrylate, a styrene compound, a maleimide compound, and a bisphenol fluorene compound.

6. The ink composition according to claim 1, wherein the ethylenically unsaturated monomer (C) comprises at least one selected from a group consisting of the following compounds:

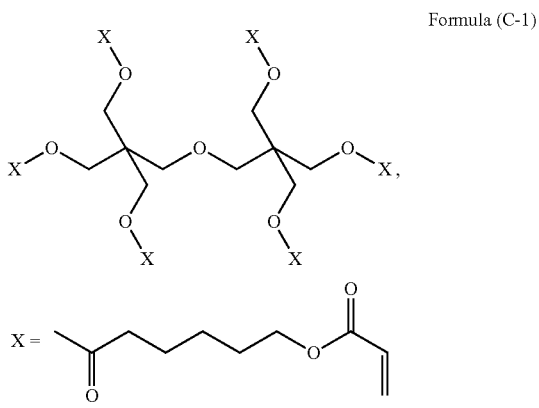

Formula (C-1)

-continued

Formula (C-2)

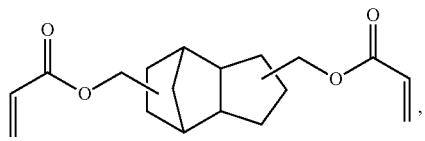

Formula (C-3)

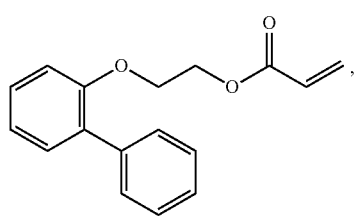

Formula (C-4)

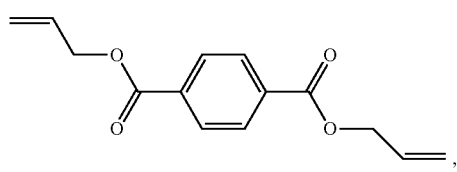

Formula (C-5)

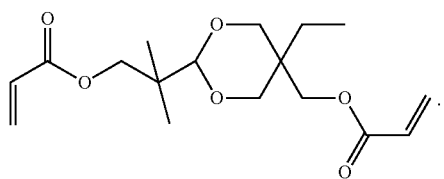

7. The ink composition according to claim 1, further comprising an additive (F), wherein the additive (F) comprises a phenyl-based compound, a phosphorus-based compound or a sulfur-based compound, the phenyl-based compound comprises at least one of a compound represented by the following formula (F-1) and a compound represented by the following formula (F-2):

Formula (F-1)

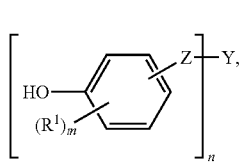

in the formula (F-1), $R^1$ is an alkyl group, m is an integer from 0 to 3, and n is an integer from 1 to 4, Z is an alkylene group,

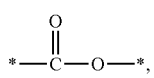

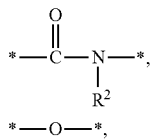

or a combination thereof, $R^2$ is hydrogen or an alkyl group, when n is 1, Y is hydrogen or an alkyl group, when n is 2, Y is a single bond, an alkylene group, S,

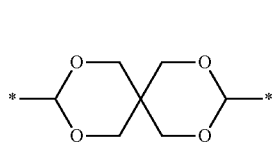

or a combination thereof, when n is 3, Y is a single bond, a trivalent alkyl group, a trivalent phenyl group,

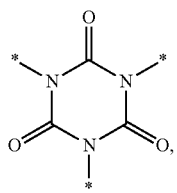

or a combination thereof, when n is 4, Y is carbon,

* represents a bonding position;

Formula (F-2)

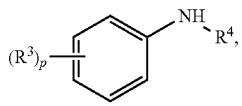

in the formula (F-2), $R^3$ is an alkyl group, $R^4$ is hydrogen or a phenyl group, and p is 0 or 1.

8. The ink composition according to claim 7, wherein the phenyl-based compound is at least one selected from a group consisting of the following compounds:

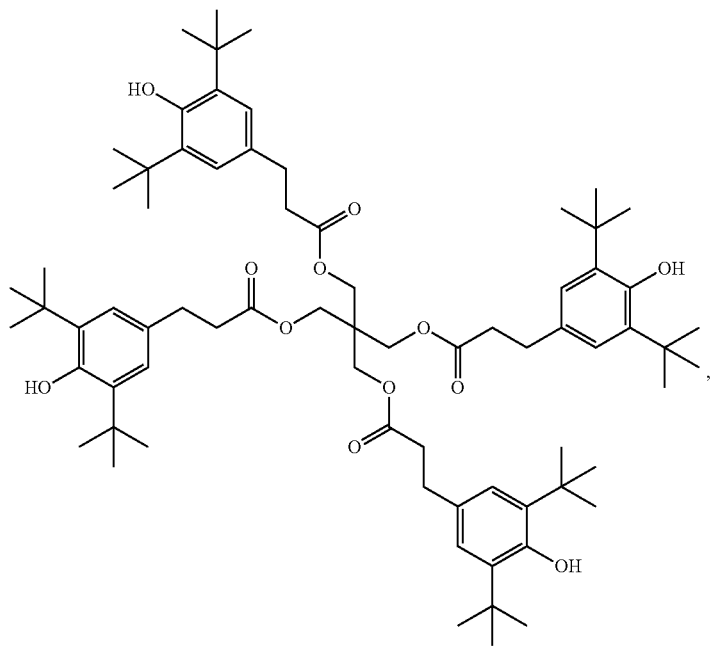
Formula (f-1)
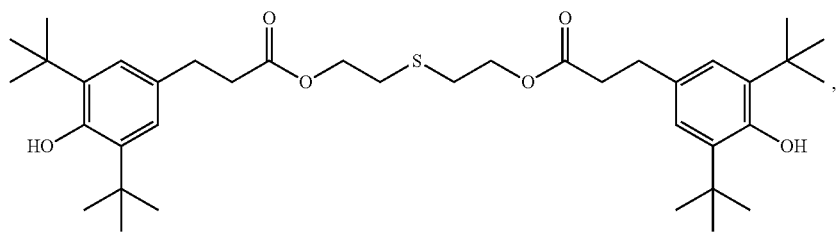
Formula (f-2)
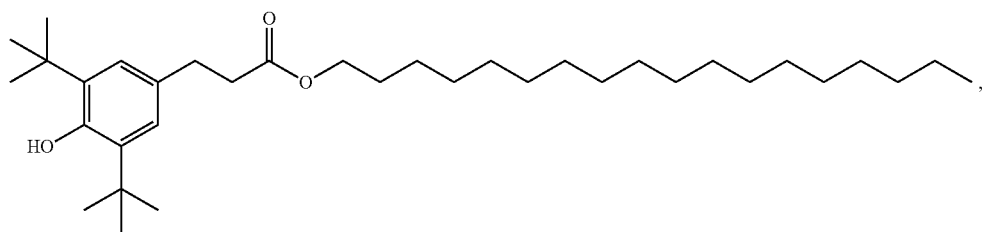
Formula (f-3)
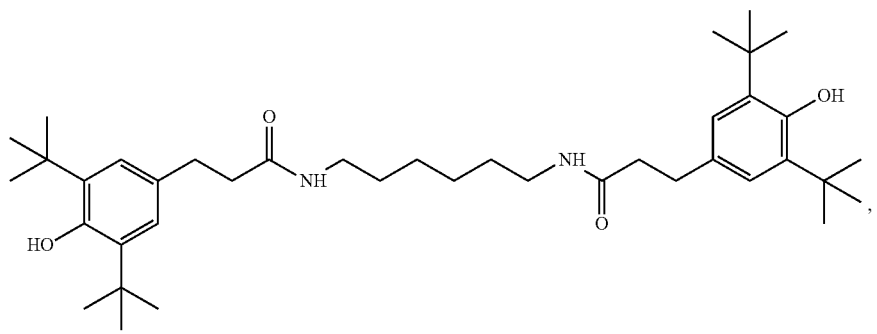
Formula (f-4)

Formula (f-5)
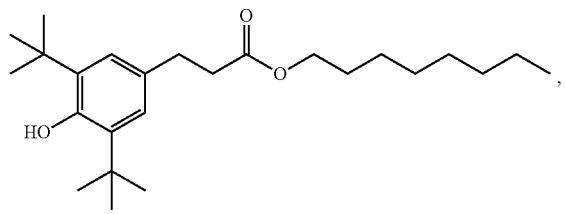
Formula (f-6)
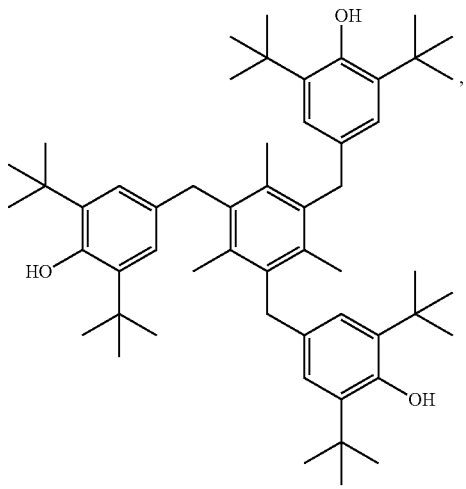
Formula (f-7)
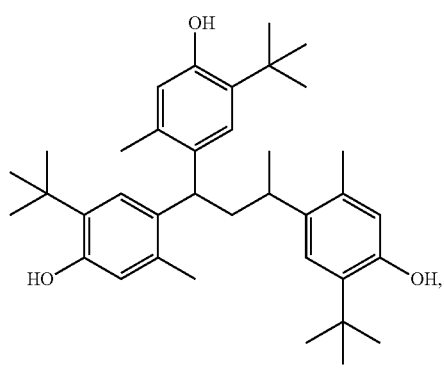
Formula (f-8)
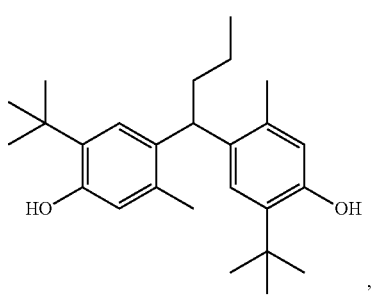
Formula (f-9)
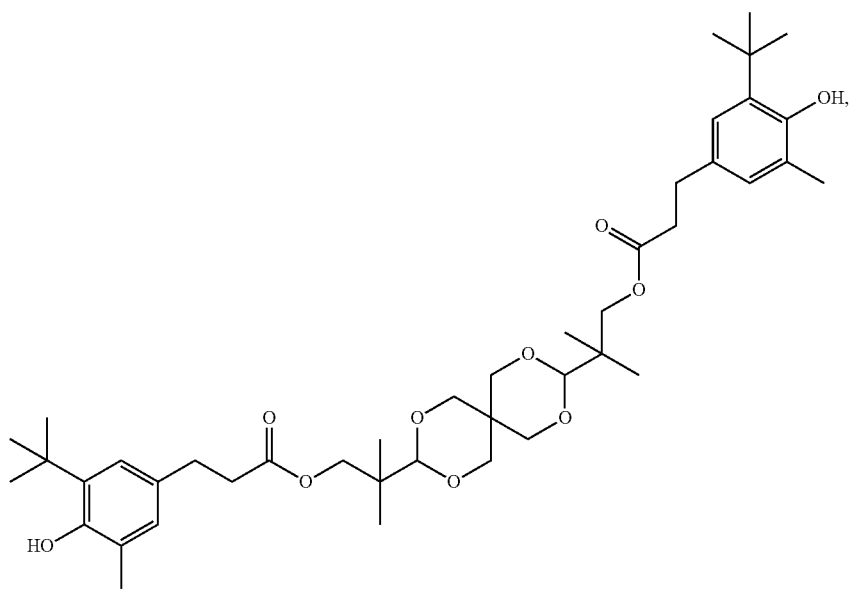

Formula (f-10)
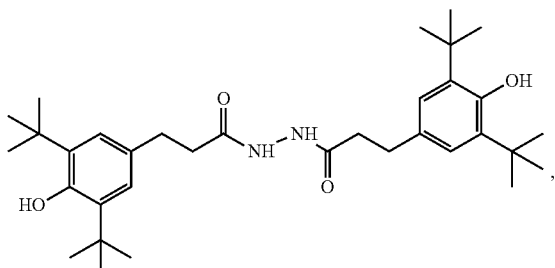
Formula (f-11)
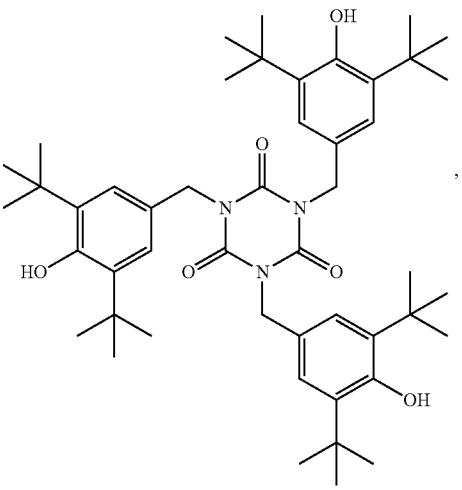
Formula (f-12)
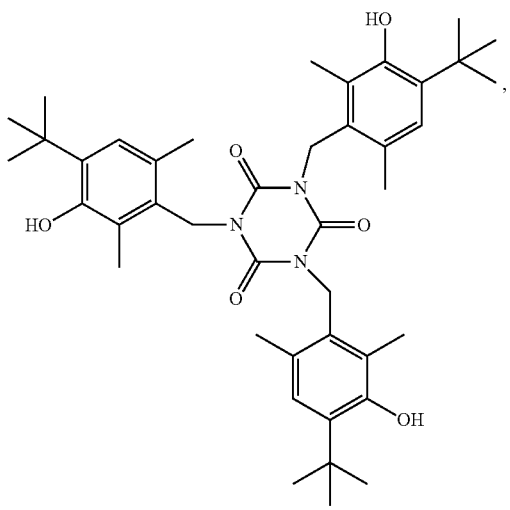
Formula (f-13)
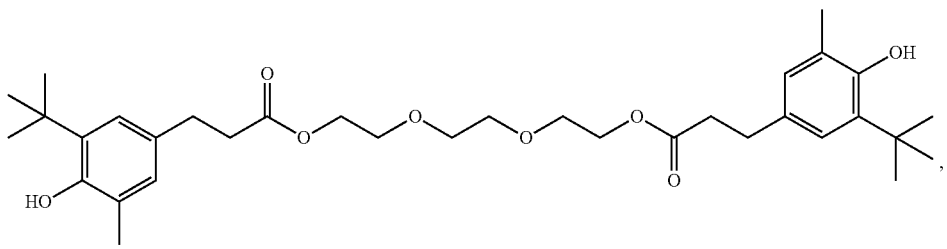
Formula (f-14)
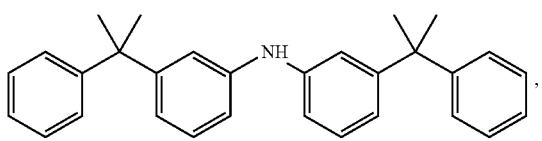
Formula (f-15)
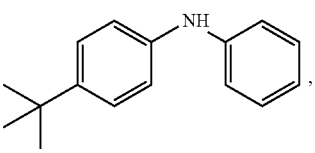
Formula (f-16)
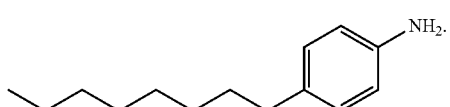

9. The ink composition according to claim 1, further comprising a scatterer (G), wherein the scatterer (G) comprises at least one selected from a group consisting of titanium dioxide, silicon dioxide, barium titanate, zirconium oxide, zinc oxide, and aluminum oxide.

10. The ink composition according to claim 1, wherein a boiling point of the solvent (E) is 180° C. to 250° C., and a surface tension is 28 mN/m or more.

11. A light conversion layer, formed of the ink composition as claimed in claim 1.

12. The light conversion layer according to claim 11, wherein light conversion layer further comprises:
   a red pattern layer, comprising red quantum dots;
   a green pattern layer, comprising green quantum dots; and
   a scatterer pattern layer, containing no quantum dots.

13. The light conversion layer according to claim 12, wherein an emission wavelength of the green quantum dots is in a range of greater than or equal to 500 nm and less than 600 nm, and an emission wavelength of the red quantum dots is in a range of greater than or equal to 600 nm and less than or equal to 800 nm.

14. A light emitting device, comprising the light conversion layer as claimed in claim 11.

15. The light emitting device according to claim 14, further comprising:
   a substrate, on which the light conversion layer is arranged; and
   a backlight module, arranged on one side of the substrate where the light conversion layer is provided.

16. The light emitting device according to claim 15, wherein the light emitting device further comprises a filter layer located between the substrate and the light conversion layer, and the filter layer comprises a red filter pattern, a green filter pattern and a blue filter pattern, the red filter pattern, the green filter pattern and the blue filter pattern contain no quantum dots.

* * * * *